(12) United States Patent
Fernando et al.

(10) Patent No.: US 9,086,700 B2
(45) Date of Patent: Jul. 21, 2015

(54) AUTONOMOUS LOCOMOTION APPARATUS, AUTONOMOUS LOCOMOTION METHOD, AND PROGRAM FOR AUTONOMOUS LOCOMOTION APPARATUS

(71) Applicant: Panasonic Corporation, Osaka (JP)

(72) Inventors: Jeffry Bonar Fernando, Osaka (JP); Katsuyoshi Yamagami, Osaka (JP); Eiichi Naito, Kyoto (JP); Toru Tanigawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 119 days.

(21) Appl. No.: 14/046,266

(22) Filed: Oct. 4, 2013

(65) Prior Publication Data

US 2014/0039676 A1 Feb. 6, 2014

Related U.S. Application Data

(63) Continuation of application No. PCT/JP2012/006300, filed on Oct. 2, 2012.

(30) Foreign Application Priority Data

Nov. 9, 2011 (JP) .................................. 2011-245693

(51) Int. Cl.
*G06F 19/00* (2011.01)
*G05D 1/02* (2006.01)

(52) U.S. Cl.
CPC .............. *G05D 1/0214* (2013.01); *G05D 1/024* (2013.01); *G05D 1/0251* (2013.01); *G05D 1/0274* (2013.01); *G05D 2201/0206* (2013.01); *Y10S 901/01* (2013.01)

(58) Field of Classification Search
USPC ................. 700/253, 255, 250, 259, 258, 245; 901/1, 46; 701/527, 467, 526, 519; 340/988; 300/301
See application file for complete search history.

(56) References Cited

U.S. PATENT DOCUMENTS 4,361,202 A * 11/1982 Minovitch ..................... 180/168
5,390,118 A * 2/1995 Margolis et al. ................ 701/23
(Continued)

FOREIGN PATENT DOCUMENTS

JP 2004-313587 11/2004
JP 2007-272474 10/2007
(Continued)

OTHER PUBLICATIONS

International Search Report issued Dec. 18, 2012 in International (PCT) Application No. PCT/JP2012/006300.
(Continued)

*Primary Examiner* — Ronnie Mancho
(74) *Attorney, Agent, or Firm* — Wenderoth, Lind & Ponack, L.L.P.

(57) ABSTRACT

An attribute about person's mobility capability is judged by a human movement attribute acquisition unit. Candidate paths for a detected person to move along are created by a human path candidate creation unit based on information about the person and a predicted time left for a collision between the autonomous locomotion apparatus and the person. A movement load for each candidate path is evaluated by a human path load evaluation unit based on an attribute of person's movement. A path which imposes a minimum movement load on the person, i.e., a path suitable for the person's mobility capability and the easiest for the person to avoid the autonomous locomotion apparatus is selected by a human path determination unit. A path for the autonomous locomotion apparatus to guide the person to the selected path is planned by a guide path planning unit.

8 Claims, 31 Drawing Sheets

(56) References Cited

U.S. PATENT DOCUMENTS

| | | | |
|---|---|---|---|
| 8,346,391 B1* | 1/2013 | Anhalt et al. | 700/248 |
| 2009/0254235 A1* | 10/2009 | Kuroda | 701/23 |
| 2010/0222925 A1* | 9/2010 | Anezaki | 700/253 |
| 2010/0235033 A1* | 9/2010 | Yamamoto et al. | 701/26 |
| 2010/0304640 A1* | 12/2010 | Sofman et al. | 446/456 |
| 2011/0117903 A1* | 5/2011 | Bradley | 455/418 |
| 2011/0288684 A1* | 11/2011 | Farlow et al. | 700/264 |
| 2014/0249676 A1* | 9/2014 | Florencio et al. | 700/259 |

FOREIGN PATENT DOCUMENTS

| | | |
|---|---|---|
| JP | 2009-223632 | 10/2009 |
| JP | 2011-110644 | 6/2011 |
| JP | 2011-204181 | 10/2011 |

OTHER PUBLICATIONS

Akira Inoue, Kenji Inoue, and Yoshikuni Ohkawa, "On-line Motion Planning of an Autonomous Mobile Robot to Avoid Multiple Moving Obstacles Based on the Prediction of Their Future Trajectories", Journal of the Robotics Society of Japan, 15 (2), pp. 249-260, Mar. 15, 1997 with an English abstract.

International Preliminary Report on Patentability and Written Opinion of the International Searching Authority issued May 22, 2014 in International (PCT) Application No. PCT/JP2012/006300.

* cited by examiner

Fig.5

|  | T[s] | |
|---|---|---|
|  | L1 | L2 |
| 1 | 7.69 | 4.98 |
| 2 | 5.72 | 5.43 |
| 3 | 6.39 | 5.68 |
| 4 | 6.46 | 5.93 |
| 5 | 6.77 | 6.03 |
| 6 | 6.18 | 5.77 |
| 7 | 6.25 | 5.18 |
| 8 | 6.61 | 5.74 |
| 9 | 6.5 | 5.78 |
| 10 | 6.68 | 5.56 |
| AVERAGE | 6.525 | 5.608 |
| STANDARD DEVIATION | 0.507 | 0.329 |

Fig.7

|  | T[s] ||
|---|---|---|
|  | L1 | L2 |
| 1 | 4.94 | 6.11 |
| 2 | 4.85 | 6.11 |
| 3 | 4.91 | 5.84 |
| 4 | 4.67 | 5.85 |
| 5 | 4.73 | 5.72 |
| 6 | 4.61 | 5.58 |
| 7 | 4.68 | 5.63 |
| 8 | 4.7 | 5.45 |
| 9 | 4.68 | 5.41 |
| 10 | 4.84 | 5.43 |
| AVERAGE | 4.761 | 5.713 |
| STANDARD DEVIATION | 0.114 | 0.262 |

| GOAL [m] | -1.0 | -0.5 | 0 | 0.5 | 1.0 | 1.5 | 2.0 | 2.5 | 3.0 |
|---|---|---|---|---|---|---|---|---|---|
| T[s] | 11.45 | 11.29 | 11.32 | 11.06 | 10.53 | 9.97 | 11.04 | 11.88 | 12.69 |

Fig.11

|  | T[s] ||
| --- | --- | --- |
|  | L1 | L2 |
| 1 | 5.48 | 4.36 |
| 2 | 5.10 | 4.71 |
| 3 | 5.65 | 4.29 |
| 4 | 5.13 | 4.75 |
| 5 | 5.13 | 4.73 |
| 6 | 4.55 | 4.28 |
| 7 | 5.10 | 4.53 |
| 8 | 4.45 | 4.53 |
| 9 | 4.75 | 4.18 |
| 10 | 4.93 | 4.48 |
| AVERAGE | 5.027 | 4.484 |
| STANDARD DEVIATION | 0.376 | 0.204 |

Fig.13

|  | T[s] | |
| --- | --- | --- |
|  | L1 | L2 |
| 1 | 4.48 | 4.90 |
| 2 | 4.30 | 4.91 |
| 3 | 4.28 | 4.68 |
| 4 | 4.18 | 4.73 |
| 5 | 4.04 | 4.94 |
| 6 | 4.40 | 4.62 |
| 7 | 4.54 | 5.21 |
| 8 | 4.32 | 4.85 |
| 9 | 4.66 | 4.62 |
| 10 | 4.34 | 4.69 |
| AVERAGE | 4.354 | 4.815 |
| STANDARD DEVIATION | 0.178 | 0.184 |

Fig.15

| GOAL [m] | -1.5 | -1.0 | -0.5 | 0 | 0.5 | 1.0 | 1.5 | 2.0 | 2.5 | 3.0 |
|---|---|---|---|---|---|---|---|---|---|---|
| T[s] | 6.05 | 5.45 | 5.80 | 5.81 | 5.07 | 4.28 | 4.43 | 5.09 | 5.34 | 5.75 |

*Fig.17*

|  | T[s] | |
| --- | --- | --- |
|  | L1 | L2 |
| 1 | 3.53 | 3.69 |
| 2 | 3.11 | 3.78 |
| 3 | 3.07 | 3.82 |
| 4 | 3.3 | 3.56 |
| 5 | 3.3 | 3.75 |
| 6 | 3.31 | 3.68 |
| 7 | 3.19 | 3.47 |
| 8 | 3.08 | 3.66 |
| 9 | 3.3 | 3.91 |
| 10 | 3.31 | 3.6 |
| AVERAGE | 3.250 | 3.692 |
| STANDARD DEVIATION | 0.140 | 0.130 |

| POINT | | |
|---|---|---|
| | x | y |
| P1 | -0.90 | -0.75 |
| P2 | 0.90 | -0.75 |
| P3 | 5.10 | -0.75 |
| P4 | 6.90 | -0.75 |
| ⋮ | ⋮ | ⋮ |
| LINE | | |
| P2-P3 | | |
| ⋮ | | |

| MOVEMENT ATTRIBUTE |
|---|
| ABLE-BODIED PERSON |
| WHEELCHAIR USER |
| CRUTCH USER |
| PERSON WALKING WITH INTRAVENOUS FEEDING EQUIPMENT |
| WALKER USER |
| WORKMAN PUSHING A HANDCART |
| ⋮ |

Fig.29A
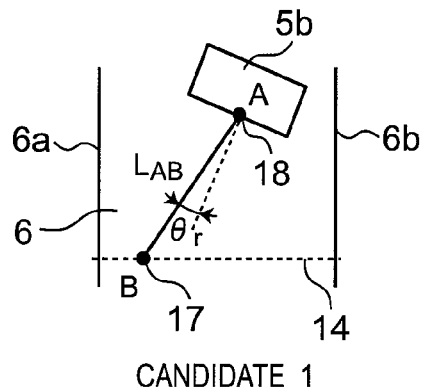
CANDIDATE 1
Fig.29B
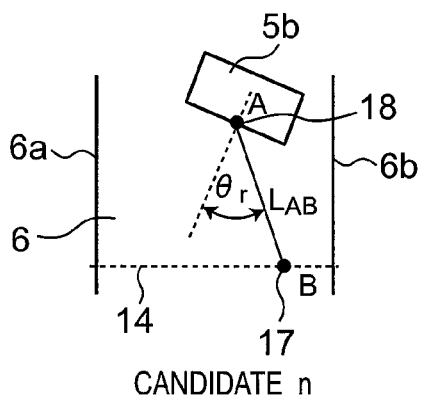
CANDIDATE n
Fig.30
| MOVEMENT ATTRIBUTE | $W_{forward}$ | $W_{direction}$ |
|---|---|---|
| ABLE-BODIED PERSON | 1.000 | 0.000 |
| WHEELCHAIR USER | 1.912 | 3.580 |
| CRUTCH USER | 0.822 | 0.985 |
| ⋮ | ⋮ | ⋮ |

|   | X[m] | y[m] | $L_{AB}$[m] | $\theta_r$[rad] | $\theta_r$[deg] | E |
|---|------|------|-------------|-----------------|-----------------|---|
| A | 0.27 | −0.64 |           |        |        |       |
| B1 | −0.45 | −2.25 | 1.764 | 0.776 | 44.436 | 6.148 |
| B2 | −0.40 | −2.25 | 1.744 | 0.802 | 45.936 | 6.204 |
| B3 | −0.35 | −2.25 | 1.725 | 0.828 | 47.469 | 6.264 |
| B4 | 0.35 | −2.25 | 1.612 | 1.246 | 71.375 | 7.541 |
| B5 | 0.40 | −2.25 | 1.615 | 1.277 | 73.147 | 7.658 |
| B6 | 0.45 | −2.25 | 1.620 | 1.307 | 74.910 | 7.777 |

|    | X[m]  | y[m]  | $L_{AB}$[m] | $\theta_r$[rad] | $\theta_r$[deg] | E     |
|----|-------|-------|-------------|-----------------|-----------------|-------|
| A  | 0.48  | -0.62 |             |                 |                 |       |
| B1 | -0.45 | -2.25 | 1.877       | 0.518           | 29.707          | 5.444 |
| B2 | -0.40 | -2.25 | 1.852       | 0.495           | 28.364          | 5.313 |
| B3 | -0.35 | -2.25 | 1.829       | 0.471           | 26.985          | 5.183 |
| B4 | 0.35  | -2.25 | 1.635       | 0.080           | 4.560           | 3.411 |
| B5 | 0.40  | -2.25 | 1.632       | 0.049           | 2.810           | 3.295 |
| B6 | 0.45  | -2.25 | 1.630       | 0.018           | 1.054           | 3.182 |

$F = F_{rij} + F_{ni} + F_{\mu i}$ $F_{ni}$: Virtual attractive force toward goal
$F_{rij}$: Virtual repulsive force from other obstacle
$F_{\mu i}$: Virtual friction force
$m_i$: Virtual mass

AUTONOMOUS LOCOMOTION APPARATUS, AUTONOMOUS LOCOMOTION METHOD, AND PROGRAM FOR AUTONOMOUS LOCOMOTION APPARATUS

CROSS-REFERENCE TO RELATED APPLICATIONS

This is a continuation application of International Application No. PCT/JP2012/006300, with an international filing date of Oct. 2, 2012, which claims priority of Japanese Patent Application No. 2011-245693 filed on Nov. 9, 2011, the content of which is incorporated herein by reference.

TECHNICAL FIELD

The technical field relates to an autonomous locomotion apparatus, an autonomous locomotion method, and a program for the autonomous locomotion apparatus, locomotion of which is controlled by a control unit.

BACKGROUND ART

In recent years, research and development has been conducted in the field of service robots which work in an environment containing a person. The service robots include, for example, a load-carrying robot which carries loads as a substitute for a person, a guard robot which conducts patrols of a facility, and a cleaning robot. These kinds of working mobile robots encounter a person while the robots are traveling. In that event, it is required for the robots to safely pass by the person.

As a conventional art, a technology of generating a trajectory of a robot to avoid a moving object typified by a human being ("On-line Motion Planning of an Autonomous Mobile Robot to Avoid Multiple Moving Obstacles Based on the Prediction of Their Future Trajectories" by Akira Inoue, Kenji Inoue, and Yoshikuni Ohkawa, Journal of the Robotics Society of Japan, 15 (2), pp. 249-260, Mar. 15, 1997) (Non-Patent Literature 1) This conventional art adopts a system of generating a trajectory to avoid multiple persons by predicting moving paths of the persons based on an idea using the potential method, which estimates that a person receives a virtual repulsive force of a robot which is approaching the person and, while changing the travel direction to a direction modified by the virtual repulsive force, moves in the modified direction.

The conventional art will be described in detail. FIGS. 34A and 34B schematically illustrate the conventional art. FIG. 34A illustrates initial positions of a robot R and two moving objects (persons) O1 and O2 with their directions of travel intersecting with one another. FIG. 34B illustrates a case where the robot R turns left while traveling. The moving object O2 accordingly changes its direction in order to move forward by avoiding the approaching robot R.

On that occasion, the robot R applies repulsive force to the moving objects (persons) O1 and O2 to predict the future moving paths of the moving objects (persons) O1 and O2 on the assumption that the robot R has a potential. As illustrated in FIG. 35, the direction of the resultant vector F of the attractive force $F_{ni}$ toward a goal of the objects O1 and O2 and the repulsive force $F_{rij}$ from the robot R of the moving object O1 or O2 is predicted as the paths of the moving objects O1 and O2. Based on the prediction, the robot R decides the action to take by itself (see Non-Patent Literature 1).

SUMMARY OF THE INVENTION

The conventional art is a system based on the assumption that the moving object (i.e., person) can move in an omnidirectional way equally into every direction. However, since person's easiness in movement may depend on the direction of movement, the trajectory generated by the conventional art to avoid the obstacle may force the person to make forced or load-applied movement.

For example, in the case of a mobile service robot which works in such a facility as a hospital, it should be considered that persons to be avoided are not limited to an able-bodied person and may include a wheelchair user, a crutch user, a person walking with medical equipment such as intravenous feeding equipment, and a workman pushing a handcart. For those kinds of persons to be avoided who cannot be necessarily expected to make equal movement with respect to a direction of travel, the conventional art has a disadvantage of incapability of generating a suitable avoidance path.

Specifically, the wheelchair user is limited to move by steering a wheelchair on two wheels. Since the wheelchair has a small turning radius in turning to move at a large angle, it is troublesome for the wheelchair user to steer the wheelchair so that the movement takes a long time. The crutch user is also limited to the movement by the two crutches. The crutch user cannot change the direction as quickly as an able-bodied person can.

Easiness of movement depends on the limitation imposed on the person to be avoided who is making such movement as direction change. Here, the easiness of movement in traveling is taken as the mobility capability of the person to be avoided.

The conventional art has a disadvantage in that it may generate such an obstacle avoiding trajectory that forces persons to be avoided with limited degrees of mobility capability like a wheelchair user and a crutch user to change their directions by a large angle according to the above described mobility capability of the person to be avoided.

The disadvantage of the conventional art will be specifically described with reference to FIGS. 36A, 36B, and 36C. FIG. 36A illustrates a case where the conventional art is applied to a person 5 who is an able-bodied person 5a. The able-bodied person 5a can move promptly in the direction of resultant vector. However, a wheelchair user 5b who is a person 5 using a wheelchair 5ba illustrated in FIG. 36B is forced to make movement involving changing the direction into the direction of the resultant vector by a large angle (see FIG. 36B). As a result, the wheelchair user 5b bears a load. That is also the case with a crutch user 5c who is a person 5 using crutches 5ca illustrated in FIG. 36C (see FIG. 36C).

JP 2004-313587 A (Patent Literature 1) describes that an automatic traveling wheelchair in a place like a cooperative dwelling for elderly people or a home for elderly people performs an avoiding operation according to the type of the obstacle. However, the obstacles are merely classified into the types such as an automatic door, an automatic lift door, and an unspecified obstacle, and mobility capability of the obstacle is not taken into account. Patent Literature 1 describes an avoiding method as merely calculating the shape and the size of the obstacle and the distance to the obstacle from image information to acquire a predetermined bypass, and is not intended to provide a path generated for the automatic traveling wheelchair to facilitate traveling of the obstacle according to the type of the moving obstacle.

One non-limiting and exemplary embodiment provides an autonomous locomotion apparatus, an autonomous locomotion method, and a program for the autonomous locomotion apparatus, each of which is capable of guiding a person, who and the autonomous locomotion apparatus are to pass each other, to a path which is suitable for the mobility capability of the person and easy for the person to avoid the autonomous locomotion apparatus.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: an autonomous locomotion apparatus which autonomously determines a moving path and moves accordingly, comprising:

an autonomous locomotion apparatus information acquisition unit that acquires a position and a speed of the autonomous locomotion apparatus;

a human detection unit that detects a person around the autonomous locomotion apparatus to acquire a position, a speed, and a direction of travel of the person;

a human movement attribute acquisition unit that acquires an attribute of person's movement based on mobility capability of the person which represents easiness of movement of the person for each of travel directions of the person detected by the human detection unit;

a human path candidate creation unit that creates a plurality of candidate paths for having the person move along based on the position and the speed of the autonomous locomotion apparatus acquired by the autonomous locomotion apparatus information acquisition unit and the position, the speed, and the direction of travel of the person acquired by the human detection unit;

a human path load evaluation unit that evaluates a movement load for each candidate path created by the human path candidate creation unit by using an evaluation formula based on information from the human path candidate creation unit and information from the human movement attribute acquisition unit, wherein the movement load represents a time taken for movement according to the person's easiness of movement for each direction of travel of the person, and the evaluation formula includes a load of a person's travel distance and a load of a person's direction change among the attributes based on the mobility capability of the person acquired by the human movement attribute acquisition unit;

a human path determination unit that determines a path for having the person move along from among the candidate paths created by the human path candidate creation unit based on the movement load calculated by the human path load evaluation unit;

a guide path planning unit that plans a path for the autonomous locomotion apparatus to guide the person to the path determined by the human path determination unit based on information from the autonomous locomotion apparatus information acquisition unit and information from the human path determination unit; and a locomotion control unit that controls the autonomous locomotion apparatus to travel along the guide path planned by the guide path planning unit based on the information from the autonomous locomotion apparatus information acquisition unit and information from the guide path planning unit.

These general and specific aspects may be implemented using a system, a method, and a computer program, and any combination of systems, methods, and computer programs.

According to the autonomous locomotion apparatus, the autonomous locomotion method, and the program for the autonomous locomotion apparatus of the aspects of the present invention, when the autonomous locomotion apparatus and a person are to pass each other, a plurality of candidate paths for the person to move along can be created, and the easiest path for the person to avoid the autonomous locomotion apparatus can be selected from among the plurality of candidate paths according to an attribute of person's movement based on mobility capability of the person, and the person can be guided to the path easy for the person to avoid the autonomous locomotion apparatus. When a path is selected from among a plurality of candidate paths, a movement load which represents a time taken for movement according to the person's easiness of movement for each direction of travel (for example, the movement load including a load of travel distance and a load of person's easiness of direction change) is evaluated according to the attribute of person's movement based on mobility capability of the person. As a result, a candidate path which imposes a minimum movement load on the person can be selected as the easiest path for the person to avoid the autonomous locomotion apparatus. Since the autonomous locomotion apparatus guides the person to the path, the person can pass by the autonomous locomotion apparatus with a small movement load.

BRIEF DESCRIPTION OF THE DRAWINGS

These and other aspects and features of the present disclosure will become clear from the following description taken in conjunction with the embodiments thereof with reference to the accompanying drawings, in which:

FIG. 5 is a view showing table-form of wheeling times spent by the wheelchair user on a path L1 and a path L2 in the Experiment 1;

FIG. 7 is a view showing table-form of wheeling times spent by the wheelchair user on a path L1 and a path L2 in the Experiment 2;

FIG. 11 is a view showing table-form of walking times spent by the crutch user walking on crutches on a path L1 and a path L2 in the Experiment 4;

FIG. 13 is a view showing table-form of walking times spent by the crutch user walking on crutches on a path L1 and a path L2 in the Experiment 5;

FIG. 15 is a view showing table-form of walking times spent by the crutch user walking on crutches on the respective paths in the Experiment 6;

FIG. 17 is a view showing table-form of walking times spent by the able-bodied person walking on a path L1 and a path L2 in the Experiment 7;

FIG. 29A is a view illustrating a method of calculating a movement load in a candidate path in the autonomous locomotion apparatus according to the first embodiment of the present invention;

FIG. 29B is a view illustrating a method of calculating a movement load in a candidate path in the autonomous locomotion apparatus according to the first embodiment of the present invention;

FIG. 30 is a view listing examples of a weight $W_{forward}$ applied to a load due to travel distance and a weight $W_{direction}$ applied to a load due to person's easiness of direction change for each movement attribute in the autonomous locomotion apparatus according to the first embodiment of the present invention;

DETAILED DESCRIPTION

Figure 1A:
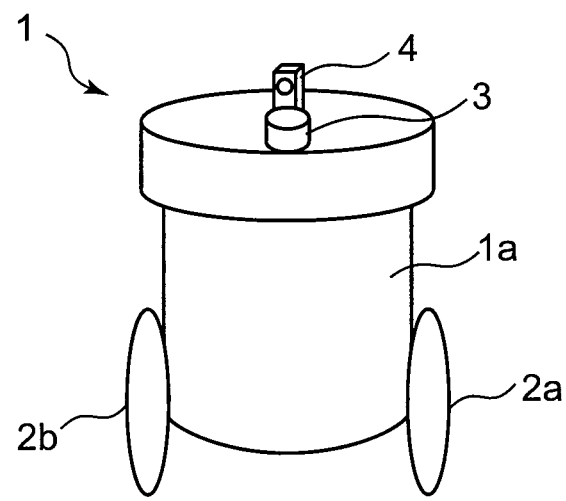
FIG. 1A is a front view of an autonomous locomotion apparatus according to a first embodiment of the present invention.

An embodiment of the present invention will be described in detail below with reference to the drawings.

Various aspects of the present invention will be described below before describing the embodiment of the present invention in detail with reference to the drawings. Examples of the disclosed technique are as follows.

1st aspect: An autonomous locomotion apparatus which autonomously determines a moving path and moves accordingly, comprising:
- an autonomous locomotion apparatus information acquisition unit that acquires a position and a speed of the autonomous locomotion apparatus;
- a human detection unit that detects a person around the autonomous locomotion apparatus to acquire a position, a speed, and a direction of travel of the person;
- a human movement attribute acquisition unit that acquires an attribute of person's movement based on mobility capability of the person which represents easiness of movement of the person for each of travel directions of the person detected by the human detection unit;
- a human path candidate creation unit that creates a plurality of candidate paths for having the person move along based on the position and the speed of the autonomous locomotion apparatus acquired by the autonomous locomotion apparatus information acquisition unit and the position, the speed, and the direction of travel of the person acquired by the human detection unit;
- a human path load evaluation unit that evaluates a movement load for each candidate path created by the human path candidate creation unit by using an evaluation formula based on information from the human path candidate creation unit and information from the human movement attribute acquisition unit, wherein the movement load represents a time taken for movement according to the person's easiness of movement for each direction of travel of the person, and the evaluation formula includes a load of a person's travel distance and a load of a person's direction change among the attributes based on the mobility capability of the person acquired by the human movement attribute acquisition unit;
- a human path determination unit that determines a path for having the person move along from among the candidate paths created by the human path candidate creation unit based on the movement load calculated by the human path load evaluation unit;
- a guide path planning unit that plans a path for the autonomous locomotion apparatus to guide the person to the path determined by the human path determination unit based on information from the autonomous locomotion apparatus information acquisition unit and information from the human path determination unit; and
- a locomotion control unit that controls the autonomous locomotion apparatus to travel along the guide path planned by the guide path planning unit based on the information from the autonomous locomotion apparatus information acquisition unit and information from the guide path planning unit.

According to the autonomous locomotion apparatus of the aspect of the present invention, when the autonomous locomotion apparatus and a person are to pass each other, a plurality of candidate paths for the person to move along can be created, and the easiest path for the person to avoid the autonomous locomotion apparatus can be selected from among the plurality of candidate paths according to an attribute of person's movement based on mobility capability of the person, and the person can be guided to the path easy for the person to avoid the autonomous locomotion apparatus. When a path is selected from among a plurality of candidate paths, a movement load which represents a time taken for movement according to the person's easiness of movement for each direction of travel (for example, the movement load including a load due to travel distance and a load due to person's easiness of direction change) is evaluated according to the attribute of person's movement based on mobility capability of the person. As a result, a candidate path which imposes a minimum movement load on the person can be selected as the easiest path for the person to avoid the autonomous locomotion apparatus. Since the autonomous locomotion apparatus guides the person to the path, the person can pass by the autonomous locomotion apparatus with a small movement load.

In evaluating the movement load which represents a time taken for movement, the movement load including not only a load due to travel distance but also a load due to person's easiness of direction change can be taken into account. Therefore, even though person's easiness of direction change differs according to mobility capability of the person, the path which is easiest for the person to avoid the autonomous locomotion apparatus and is suitable for the mobility capability of the person can be planned, so that the person can be guided to the path.

2nd aspect: The autonomous locomotion apparatus according to the 1st aspect, wherein the human movement attribute acquisition unit acquires information about the person's direction change as a human movement attribute.

According to the autonomous locomotion apparatus of the aspect of the present invention, the movement attribute of the person can be acquired. When the movement attribute of the person becomes apparent, the person's easiness of direction change is known.

3rd aspect: The autonomous locomotion apparatus according to the 1st or 2nd aspect, further comprising
- a collision judgment unit that judges presence or absence of probability of collision between the person detected by the human detection unit and the autonomous locomotion apparatus based on the information from the autonomous locomotion apparatus information acquisition unit and information from the human detection unit,
- wherein when the collision judgment unit judges that there is the probability of collision between the person and the autonomous locomotion apparatus, the human path candidate creation unit creates a candidate path for having the person move along based on information from the collision judgment unit.

According to the autonomous locomotion apparatus of the aspect of the present invention, the probability of collision between the autonomous locomotion apparatus and the person is judged based on the information from the autonomous locomotion apparatus and the information from the person, and when there is the probability of collision, a candidate path for the person to move along can be created. In other words, when there is not the probability of collision, the autonomous locomotion apparatus can keep traveling on the ordinary path.

4th aspect: The autonomous locomotion apparatus according to the 3rd aspect, wherein the human path candidate creation unit determines a goal of the candidate path based on a predicted time left for the autonomous locomotion apparatus and the person to collide with each other and the speed of the person.

According to the autonomous locomotion apparatus of the aspect of the present invention, when the information from the current autonomous locomotion apparatus and the information from the person are maintained, a region in which the autonomous locomotion apparatus and the person may collide with each other can be predicted and a goal of the candidate path can be set around the region of possible collision.

5th aspect: The autonomous locomotion apparatus according to the 1st or 2nd aspect, wherein the human path determination unit determines a path for having the person move along based on an environment map for the autonomous locomotion apparatus to travel and the movement load calculated by the human path load evaluation unit.

According to the autonomous locomotion apparatus of the aspect of the present invention, a path for the person to move along can be determined by taking account of an environment map for the autonomous locomotion apparatus to travel and the movement load in each of the candidate paths. For example, when a known static obstacle (trash can, or the like) is ahead of a candidate path, the candidate path is not selected. Meanwhile, it is assumed that the known static obstacle is included in the environment map.

6th aspect: The autonomous locomotion apparatus according to the 1st or 2nd aspect, wherein the human path determination unit selects a candidate path which imposes a minimum movement load on the person and is easy for the person to avoid the autonomous locomotion apparatus.

According to the autonomous locomotion apparatus of the aspect of the present invention, a candidate path which imposes a minimum movement load on the person can be selected from among the plurality of candidate paths and determined as the easiest path for the person to avoid the autonomous locomotion apparatus, i.e., the path which requires the shortest time from the person to move along.

7th aspect: An autonomous locomotion method for an autonomous locomotion apparatus which autonomously determines a moving path and moves accordingly, comprising:

acquiring a position and a speed of an autonomous locomotion apparatus by an autonomous locomotion apparatus unit;

detecting a person around the autonomous locomotion apparatus to acquire a position, a speed, and travel directions of the person by a human detection unit;

acquiring, by a human movement attribute acquisition unit, an attribute of person's movement based on mobility capability of the person which represents easiness of movement of the person for each of the travel directions of the person detected by the human detection unit;

creating a plurality of candidate paths for having the person move along by a human path candidate creation unit based on the position and the speed of the autonomous locomotion apparatus acquired by the autonomous locomotion apparatus unit and the position, the speed, and the travel direction of the person acquired by the human detection unit;

evaluating a movement load for each of the candidate paths created by the human path candidate creation unit by using an evaluation formula by a human path load evaluation unit based on the information from the human path candidate creation unit and the information from the human movement attribute acquisition unit, wherein the movement load represents a time taken for movement according to the person's easiness of movement for each the travel directions of the person, and the evaluation formula includes a load of a person's travel distance and a load of a person's direction change among the attributes based on the mobility capability of the person acquired by the human movement attribute acquisition unit;

determining, by a human path determination unit, a path for having the person move along from among the candidate paths created by the human path candidate creation unit, based on the movement load calculated by the human path load evaluation unit;

planning, by a guide path planning unit, a path for the autonomous locomotion apparatus to guide the person to the path determined by the human path determination unit, based on the information from the autonomous locomotion apparatus information acquisition unit and the information from the human path determination unit; and controlling the autonomous locomotion apparatus to travel along the guide path planned by the guide path planning unit, by a locomotion control unit, based on the information from the autonomous locomotion apparatus information acquisition unit and the information from the guide path planning unit.

According to the autonomous locomotion apparatus of the aspect of the present invention, when the autonomous locomotion apparatus and a person are to pass each other, a plurality of candidate paths for the person to move along are created, and the easiest path for the person to avoid the autonomous locomotion apparatus is selected from among the plurality of candidate paths according to an attribute of person's movement based on mobility capability of the person, so that the person can be guided to the path easiest for the person to avoid the autonomous locomotion apparatus. When a path is selected from among the plurality of candidate paths, a movement load which represents a time taken for movement according to the person's easiness of movement for each direction of travel (for example, the movement load including a load due to travel distance and a load due to person's easiness of direction change) is evaluated according to the attribute of person's movement based on mobility capability of the person. As a result, a candidate path which imposes a minimum movement load on the person can be selected as the easiest path for the person to avoid the autonomous locomotion apparatus. Since the autonomous locomotion apparatus guides the person to the path, the person can pass by the autonomous locomotion apparatus with a small movement load.

In evaluating the movement load which represents a time taken for movement, the movement load including not only a load due to travel distance but also a load due to person's easiness of direction change can be taken into account. Therefore, even though person's easiness of direction change differs according to mobility capability of the person, the easiest path for the person to avoid the autonomous locomotion apparatus and suitable for the mobility capability of the person can be planned, so that the person can be guided to the path.

8th aspect: A computer-readable recording medium including a program for controlling an autonomous locomotion apparatus which autonomously determines a moving path and moves accordingly, wherein the program causes a computer to function as:
an autonomous locomotion apparatus information acquisition means that acquires a position and a speed of the autonomous locomotion apparatus;
a human movement attribute acquisition unit that acquires an attribute of person's movement based on mobility capability of the person which represents easiness of movement of the person for each of travel directions of the person detected by a human detection unit that detects a person around the autonomous locomotion apparatus to acquire a position, a speed, and a direction of travel of the person;
a human path candidate creation unit that creates a plurality of candidate paths for having the person move along based on the position and the speed of the autonomous locomotion apparatus acquired by the autonomous locomotion apparatus information acquisition unit and the position, the speed, and the direction of travel of the person acquired by the human detection unit;
a human path load evaluation unit that evaluates a movement load for each of candidate paths created by the human path candidate creation unit by using an evaluation formula based on information from the human path candidate creation unit and information from the human movement attribute acquisition unit, wherein the movement load represents a time taken for movement according to the person's easiness of movement for each of travel directions of travel, and the evaluation formula includes a load of a person's travel distance and a load of a person's direction change among the attributes based on the mobility capability of the person acquired by the human movement attribute acquisition unit;
a human path determination unit that determines a path for having the person move along from among the candidate paths created by the human path candidate creation unit based on the movement load calculated by the human path load evaluation unit;
a guide path planning unit that plans a path for the autonomous locomotion apparatus to guide the person to the path determined by the human path determination unit based on information from the autonomous locomotion apparatus information acquisition unit and information from the human path determination unit; and
a locomotion control unit that controls the autonomous locomotion apparatus to travel along the guide path planned by the guide path planning unit based on the information from the autonomous locomotion apparatus information acquisition unit and information from the guide path planning unit.

According to the program for the autonomous locomotion apparatus of the aspect of the present invention, when the autonomous locomotion apparatus and a person are to pass each other, a plurality of candidate paths for the person to move along are created, and the easiest path for the person to avoid the autonomous locomotion apparatus is selected from among the plurality of candidate paths according to an attribute of person's movement based on mobility capability of the person, so that the person can be guided to the path easy for the person to avoid the autonomous locomotion apparatus. When a path is selected from among a plurality of candidate paths, a movement load which represents a time taken for movement according to the person's easiness of movement for each direction of travel (for example, the movement load including a load due to travel distance and a load due to person's easiness of direction change) is evaluated according to the attribute of person's movement based on mobility capability of the person. As a result, a candidate path which imposes a minimum movement load on the person can be selected as the easiest path for the person to avoid the autonomous locomotion apparatus. Since the autonomous locomotion apparatus guides the person to the path, the person can pass by the autonomous locomotion apparatus with a small movement load.

In evaluating the movement load which represents a time taken for movement, the movement load including not only a load due to travel distance but also a load due to person's easiness of direction change can be taken into account. Therefore, even though person's easiness of direction change differs according to mobility capability of the person, the easiest path for the person to avoid the autonomous locomotion apparatus and suitable for the mobility capability of the person can be planned, so that the person can be guided to the path.

A first embodiment of the present invention will be described in detail below with reference to the drawings.

Figure 1B:
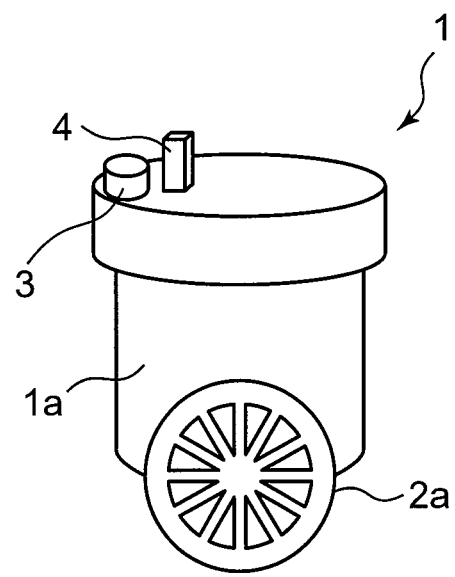
FIG. 1B is a side view of the autonomous locomotion apparatus according to the first embodiment of the present invention.
Figure 2A:
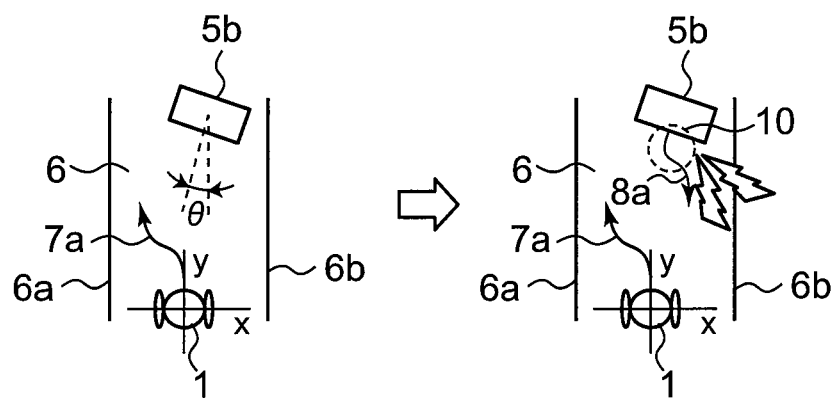
FIG. 2A is a view illustrating a scene of an autonomous locomotion apparatus and a wheelchair user passing each other.
Figure 2B:
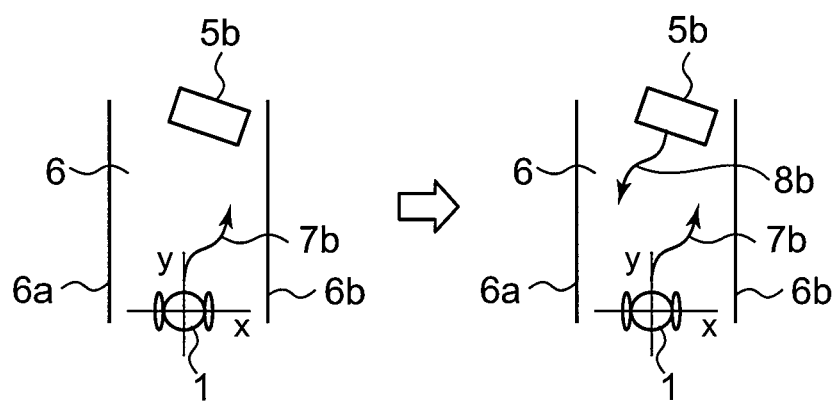
FIG. 2B is a view illustrating a scene of the autonomous locomotion apparatus and the wheelchair user passing each other.

First, as illustrated in FIGS. 1A and 1B, an autonomous locomotion apparatus 1 of the first embodiment of the present invention is constituted of an autonomously movable mobile body with a left wheel 2a and a right wheel 2b independently arranged at a lower part of a cylindrical autonomous locomotion apparatus main body (mobile body) 1a to rotate forward and backward. Attention will be focused on the event of such an autonomous locomotion apparatus 1 and a wheelchair user 5b passing each other. FIGS. 2A and 2B illustrate scenes of the autonomous locomotion apparatus 1 and the wheelchair user 5b passing each other in a passage 6. Based on the coordinate system on the autonomous locomotion apparatus 1, the wheelchair user 5b is on the right side of the autonomous locomotion apparatus 1. The wheelchair user 5b forms a large angle to the longitudinal direction of the passage 6 (see θ). The width of the passage 6 between a left wall 6a and a right wall 6b is a dimension for the autonomous locomotion apparatus 1 and the wheelchair user 5b to pass each other.

In the left figure of FIG. 2A, since the wheelchair user 5b is on the right side of the autonomous locomotion apparatus 1, the autonomous locomotion apparatus 1 moves nearer to the left wall 6a first as denoted by an arrow 7a. In response to the movement of the autonomous locomotion apparatus 1 as denoted by the arrow 7a, the wheelchair user 5b moves nearer to the right wall 6b as denoted by an arrow 8a (see the right figure of FIG. 2A). However, the initial direction of movement in the movement of the wheelchair user 5b who is moving along the arrow 7a forces the wheelchair user 5b to largely change the direction to move nearer to the right wall 6b as denoted by the arrow 8a (the reference numeral 10 denotes a portion of a path taken by the person 5 in which the person 5 largely changes the direction). As a result, the movement of the autonomous locomotion apparatus 1 forces the wheelchair user 5b to take the movement applied with a load. A zigzag pattern in the right figure of FIG. 2A indicates that the movement is troublesome for the wheelchair user 5b because it applies a load to the wheelchair user 5b.

On the other hand, in FIG. 2B, the autonomous locomotion apparatus 1 moves nearer to the right wall 6b first as denoted by an arrow 7b. In response to the movement of the autonomous locomotion apparatus 1 as denoted by the arrow 7b, the wheelchair user 5b moves nearer to the left wall 6a as denoted by an arrow 8b. In that case, with a small angle of the wheelchair user 5b to change the direction, the wheelchair user 5b can move swiftly.

Figure 3A:
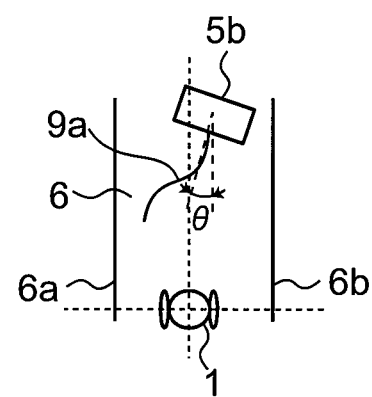
FIG. 3A is a view illustrating the easiest path for a person to avoid the autonomous locomotion apparatus.
Figure 3B:
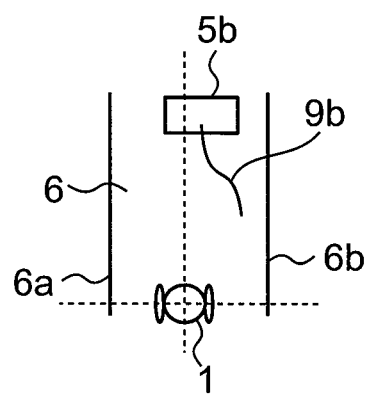
FIG. 3B is a view illustrating the easiest path for a person to avoid the autonomous locomotion apparatus.

Therefore, the autonomous locomotion apparatus 1 first needs to notice a path which is easy for the person 5 to avoid the autonomous locomotion apparatus 1 corresponding to the mobility capability of the person 5 (in this case, easiness of changing the direction). In the case of the wheelchair user 5b, even though the autonomous locomotion apparatus 1 is located at the same position, the path 9 (9a, 9b) which is the easiest for the person 5 to avoid the autonomous locomotion apparatus 1 may differ according to the initial direction in which the person 5 faces (see FIGS. 3A and 3B). For example, in the case of FIG. 3A, since the wheelchair user 5b is taking a direction to face the left wall 6a as the initial direction, the path along which the wheelchair user 5b moves near to the left wall 6a is the easy path 9a for the wheelchair user 5b to avoid the autonomous locomotion apparatus 1. On the other hand, in the case of FIG. 3B, since the wheelchair user 5b is taking a direction to squarely face the autonomous locomotion apparatus 1 as the initial direction and is located near to the right wall 6b from the center, the path along which the wheelchair user 5b moves near to the right wall 6b is the easy path 9b for the wheelchair user 5b to avoid the autonomous locomotion apparatus 1. Once the easiest path for the person to avoid the autonomous locomotion apparatus 1 is known to the autonomous locomotion apparatus 1 as described above, the autonomous locomotion apparatus 1 is required to operate to guide the person to the path.

Experiments to prove the grounds for the above description and effectiveness of the solution to the problem using the configuration of the above described embodiment of the present invention will be described below. Now, seven experiments which are conducted as typical examples will be described. <Experiment 1> to <Experiment 3>, <Experiment 4> to <Experiment 6>, and <Experiment 7> are experiments on a wheelchair user, a crutch user, and an able-bodied person, respectively.

<Experiment 1: An Experiment in the Case where the Wheelchair User 5b Forms a Large Direction Angle θ with the Longitudinal Direction of a Passage 6A when the Autonomous Locomotion Apparatus 1 Detects the Wheelchair User 5b>

Figure 4:
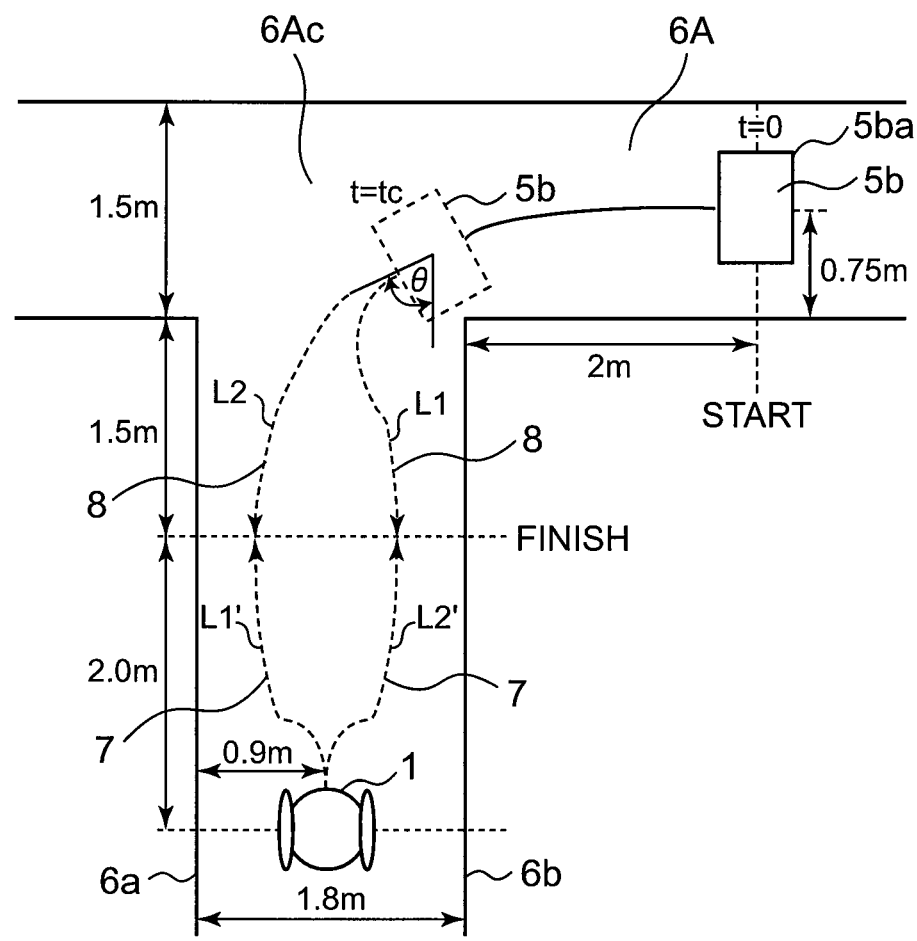
FIG. 4 is a view illustrating <Experiment 1: an experiment in the case where a wheelchair user forms a large direction angle with a passage when the wheelchair user is detected>.

FIG. 4 is a view illustrating conditions for the experiment 1. In the drawings including FIG. 4, a path 7 is the path along which the autonomous locomotion apparatus 1 travels when the autonomous locomotion apparatus 1 and the person 5 pass each other and a path 8 is the path along which the person 5 moves along in response to the movement of the autonomous locomotion apparatus 1.

In the passage 6A, the wheelchair user 5b who is a person using the wheelchair 5ba starts moving from a starting position "START" toward an intersection 6Ac of the T-junction, while the autonomous locomotion apparatus 1 is on standby at first. The wheelchair user 5b turns to the left at the intersection 6Ac of the T-junction. When the wheelchair user 5b appears at the intersection 6Ac of the T-junction, the wheelchair user 5b is detected by the autonomous locomotion apparatus 1, and the autonomous locomotion apparatus 1 moves to travel along a path L1' (a path near to the left wall 6a) or a path L2' (a path near to the right wall 6b). When the autonomous locomotion apparatus 1 takes the path L1', the wheelchair user 5b takes a path L1 (a path near to the right wall 6b) so that the autonomous locomotion apparatus 1 and the wheelchair user 5b can pass each other. On the other hand, when the autonomous locomotion apparatus 1 takes the path L2', the wheelchair user 5b takes a path L2 (a path near to the left wall 6a) so that the autonomous locomotion apparatus 1 and the wheelchair user 5b can pass each other. Here, wheeling times spent by the wheelchair user 5b on the path L1 and the path L2 from the starting position "START" to an ending position "FINISH" are measured respectively.

The Experiment 1 is repeated twenty times, so that the autonomous locomotion apparatus 1 can randomly take the path L1' or L2' in the Experiment 1.

FIG. 5 shows wheeling times (travel times) spent by the wheelchair user 5b on the path L1 and the path L2 in the Experiment 1. The average times for the path L1 and the path L2 are 6.525[s] (standard deviation 0.507 [s]) and 5.608 [s] (standard deviation 0.329 [s]), respectively, therefore, the wheeling time is shorter in the path L2 than that in the path L1. That is, when the wheelchair user 5b forms a large direction angle θ with the longitudinal direction of the passage 6A, the path L2 is the easier path for the wheelchair user 5b to avoid the autonomous locomotion apparatus 1 than the path L1.

From the Experiment 1, it is understood that the path L2 is the easier path for the wheelchair user 5b to avoid the autonomous locomotion apparatus 1 because the angle of direction change θ is smaller in the path L2 even though the travel distance is shorter in the path L1. Therefore, in that case, when the autonomous locomotion apparatus 1 takes the path L2, the wheelchair user 5b accordingly takes the easy path L2 to avoid the autonomous locomotion apparatus 1.

<Experiment 2: An Experiment in the Case where the Wheelchair User 5b Forms a Small Direction Angle θ with the Longitudinal Direction of a Passage 6B when the Wheelchair User 5b is Detected>

Figure 6:
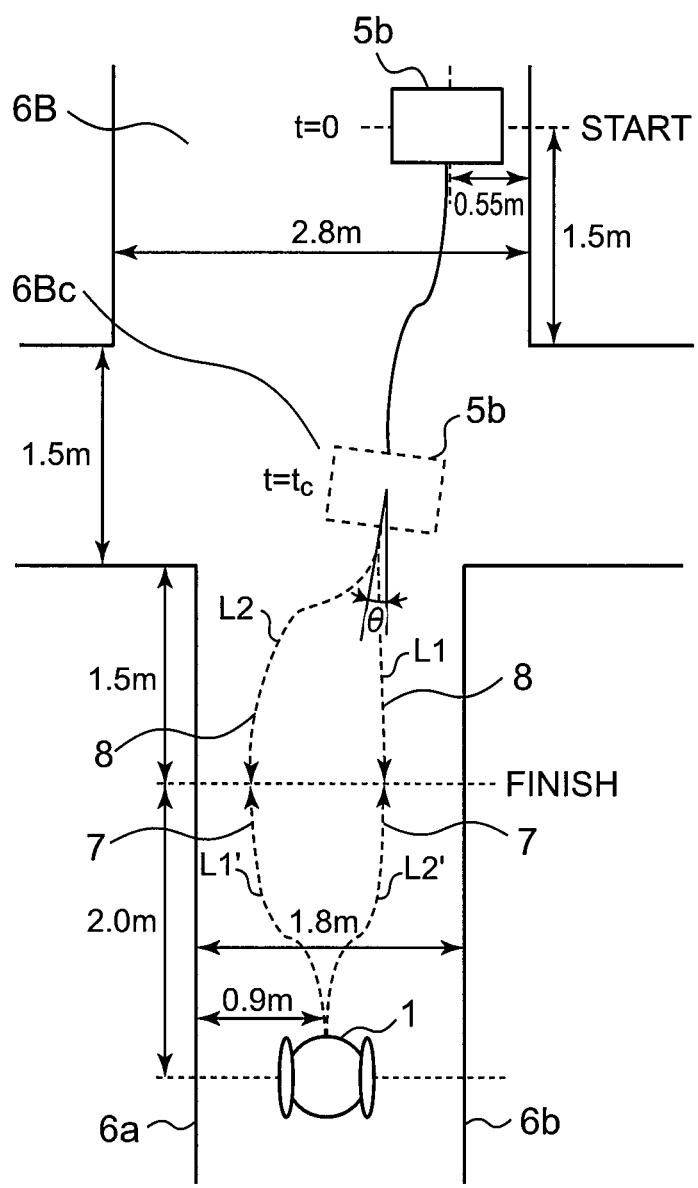
FIG. 6 is a view illustrating <Experiment 2: an experiment in the case where a wheelchair user forms a small direction angle with a passage when the wheelchair user is detected>.

FIG. 6 is a view illustrating conditions for the Experiment 2.

In the passage 6B, the wheelchair user 5b starts moving from a starting position "START" toward an intersection 6Bc of a crossroad, while the autonomous locomotion apparatus 1 is on standby at first. The wheelchair user 5b passes the intersection 6Bc of the crossroad to go straight ahead. Since the width of the passage 6B slightly narrows at the intersection 6Bc of the crossroad, the wheelchair user 5b changes the direction only by a small angle θ with respect to the passage 6B. When the wheelchair user 5b passes the intersection 6Bc of the crossroad, the wheelchair user 5b is detected by the autonomous locomotion apparatus 1, and the autonomous locomotion apparatus 1 moves to take a path L1' (a path near to the left wall 6a) or a path L2' (a path near to the right wall 6b). When the autonomous locomotion apparatus 1 takes the path L1', the wheelchair user 5b takes a path L1 (a path near to the right wall 6b) so that the autonomous locomotion apparatus 1 and the wheelchair user 5b can pass each other. On the other hand, when the autonomous locomotion apparatus 1 takes the path L2', the wheelchair user 5b takes a path L2 (a path near to the left wall 6a) so that the autonomous locomotion apparatus 1 and the wheelchair user 5b can pass each other. Here, wheeling times spent by the wheelchair user 5b on the path L1 and the path L2 from the starting position "START" to an ending position "FINISH" are measured respectively.

The Experiment 2 is repeated twenty times, so that the autonomous locomotion apparatus 1 can randomly take the path L1 or L2' in the Experiment 2.

FIG. 7 shows wheeling times spent by the wheelchair user 5b on the path L1 and the path L2 in the Experiment 2. The average times for the path L1 and the path L2 are 4.761 [s] (standard deviation 0.114 [s]) and 5.713 [s] (standard deviation 0.262 [s]), respectively, therefore, the wheeling time is shorter in the path L1 than that in the path L2. That is, when the wheelchair user 5b forms a small direction angle θ with the longitudinal direction of the passage 6B, the path L1 is the easier path for the wheelchair user 5b to avoid the autonomous locomotion apparatus 1 than the path L2.

From the Experiment 2, it is understood that the path L1 is an easier path for the wheelchair user 5b to avoid the autonomous locomotion apparatus 1 than the path L2 is because the travel distance is shorter in the path L1 and the angle of direction change θ is smaller in the path L1 than that in the path L2. Therefore, in that case, when the autonomous locomotion apparatus 1 takes the path L1', the wheelchair user 5b accordingly takes the easy path L1 to avoid the autonomous locomotion apparatus 1.

<Experiment 3: An Experiment in the Case where the Wheelchair User 5b Wheels Himself or Herself on Paths 6 of Various Degrees of Curvature>

Figure 8A:
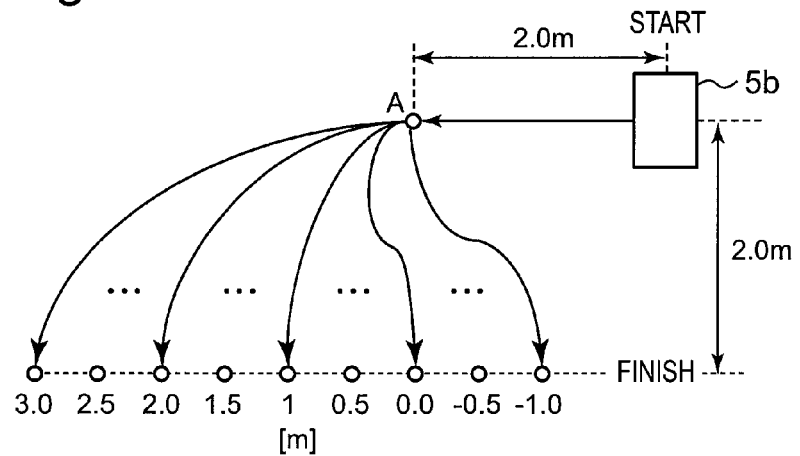
FIG. 8A is a view illustrating <Experiment 3: an experiment in the case where a wheelchair user wheels himself or herself on paths of various degrees of curvature>.

FIG. 8A is a view illustrating conditions for the Experiment 3.

The wheelchair user 5b starts moving from a starting position "START" straight to a point A leftward at first. Then at the point A, the wheelchair user 5b changes the direction by turning left and starts for a goal at the ending position "FINISH". At this moment, the goal position is shifted in the transverse direction in FIG. 8A by a predetermined interval for the purpose of creating paths of various degrees of curvature from the point A to the ending position "FINISH" (goal). Wheeling times spent by the wheelchair user 5b from the starting position "START" to the respective goals at the ending position "FINISH" are measured respectively.

Figure 8B:
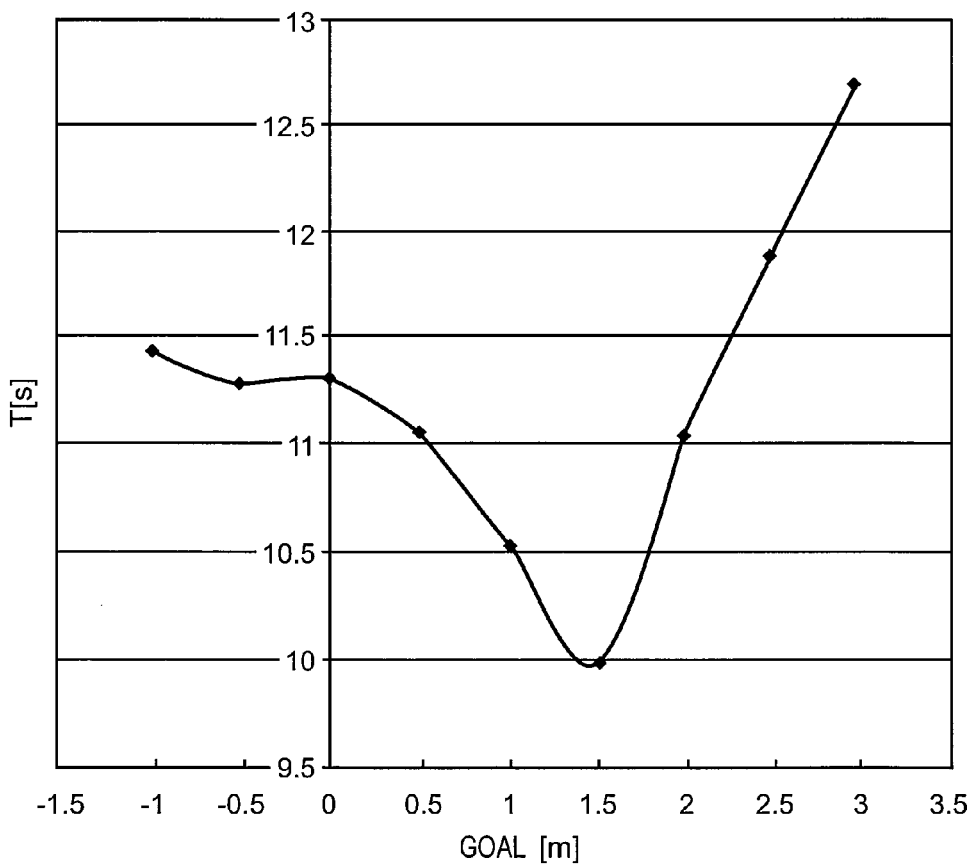
FIG. 8B is a view showing a graph plotting the results of <Experiment 3: an experiment in the case where a wheelchair user wheels himself or herself on the paths of various degrees of curvature>.
Figures 9, 10:
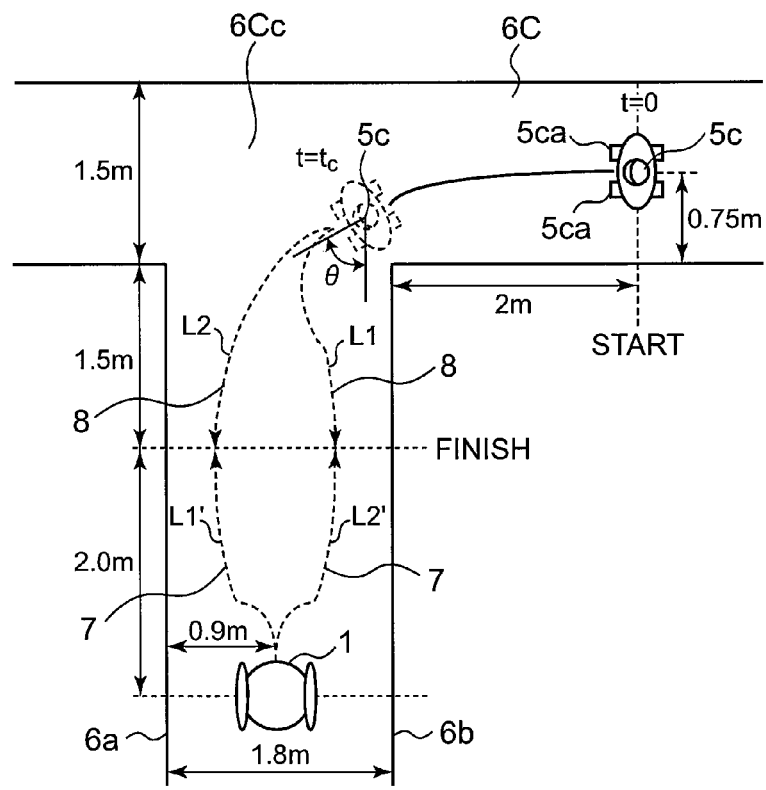
FIG. 9 is a view showing table-form of wheeling times spent by the wheelchair user on the respective paths in the Experiment 3.
FIG. 10 is a view illustrating <Experiment 4: an experiment in the case where a crutch user forms a large direction angle with a passage when the crutch user is detected>.

FIG. 9 shows wheeling times spent by the wheelchair user 5b on the respective paths in the Experiment 3. The wheeling times on the respective paths toward the goal positions are plotted in FIG. 8B. The path from the point A to the rightmost goal at −1.0 m has the largest angle of direction change among the paths. When the goal is shifted to the left from the rightmost goal at −0.1 m to the goal at 1.5 m in FIG. 8A, the angle of direction change becomes smaller and the wheeling time becomes shorter. However, when the goal is further shifted to the left stepwise after the goal at 1.5 m, the travel distance becomes longer, therefore, the wheeling time turns to be longer again. The wheeling time is the shortest at the goal at 1.5 m. That is, from the Experiment 3, it is understood that the easiness of direction change based on the movement attribute of the wheelchair user 5b and the travel distance need to be taken into account in planning the easiest path for the person 5 to avoid the autonomous locomotion apparatus 1.

<Experiment 4: An Experiment in the Case where the Crutch User 5c Forms a Large Direction Angle θ with the Longitudinal Direction of a Passage 6C when the Crutch User 5c is Detected>

FIG. 10 is a view illustrating conditions for the Experiment 4.

In the passage 6C, the crutch user 5c who is using a crutch 5ca starts moving from a starting position "START" toward an intersection 6Cc of the T-junction, while the autonomous locomotion apparatus 1 is on standby at first. The crutch user 5c turns to the left at the intersection 6Cc of the T-junction. When the crutch user 5c appears at the intersection 6Cc of the T-junction, the crutch user 5c is detected by the autonomous locomotion apparatus 1, and the autonomous locomotion apparatus 1 moves to take a path L1' (a path near to the left wall 6a) or a path L2' (a path near to the right wall 6b). When the autonomous locomotion apparatus 1 takes the path L1', the crutch user 5c takes a path L1 (a path near to the right wall 6b) so that the autonomous locomotion apparatus 1 and the crutch user 5c can pass each other. On the other hand, when the autonomous locomotion apparatus 1 takes the path L2', the crutch user 5c takes a path L2 (a path near to the left wall 6a) so that the autonomous locomotion apparatus 1 and the crutch user 5c can pass each other. Here, walking times spent by the crutch user 5c on the path L1 and the path L2 from the starting position "START" to an ending position "FINISH" are measured respectively.

The Experiment 4 is repeated twenty times, so that the autonomous locomotion apparatus 1 can randomly take the path L1' or L2' in the Experiment 4.

FIG. 11 shows walking times spent by the crutch user 5c on the path L1 and the path L2 in the Experiment 4. The average times for the path L1 and the path L2 are 5.027[s] (standard deviation 0.376 [s]) and 4.484 [s] (standard deviation 0.204 [s]), respectively, therefore, the walking time is shorter in the path L2 than that in the path L1. That is, when the crutch user 5c forms a large direction angle θ with the longitudinal direction of the passage 6C, the path L2 is the easier path for the crutch user 5c to avoid the autonomous locomotion apparatus 1 than the path L1.

From the Experiment 4, it is understood that the path L2 is the easier path for the crutch user 5c to avoid the autonomous locomotion apparatus 1 because the angle of direction change θ is smaller in the path L2 even though the travel distance is shorter in the path L1. Therefore, in that case, when the autonomous locomotion apparatus 1 takes the path L2', the crutch user 5c accordingly takes the easy path to avoid the autonomous locomotion apparatus 1.

<Experiment 5: An Experiment in the Case where the Crutch User 5c Forms a Small Direction Angle θ with the Longitudinal Direction of a Passage 6D when the Crutch User 5c is Detected>

Figure 12:
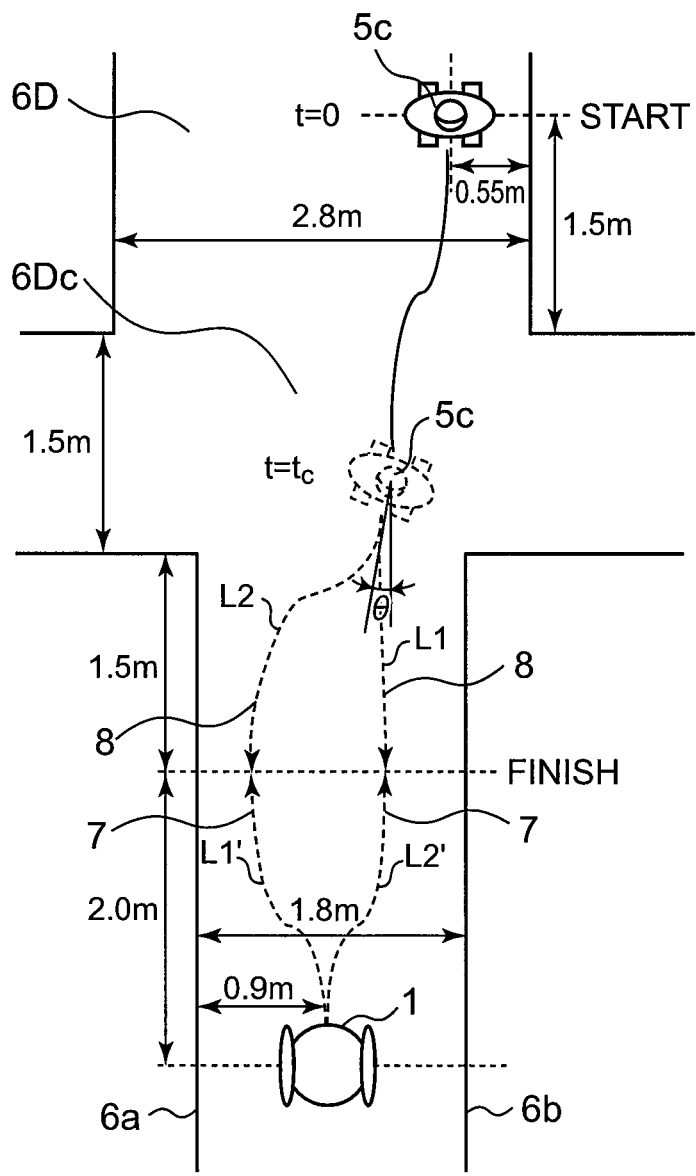
FIG. 12 is a view illustrating <Experiment 5: an experiment in the case where a crutch user forms a small direction angle with a passage when the crutch user is detected>.

FIG. 12 is a view illustrating conditions for the Experiment 5.

In the passage 6D, the crutch user 5c starts moving from a starting position "START" toward an intersection 6Dc of a crossroad, while the autonomous locomotion apparatus 1 is on standby at first. The crutch user 5c passes the intersection 6Dc of the crossroad and then goes straight ahead. Since the width of the passage 6D slightly narrows at the intersection 6Dc of the crossroad, the crutch user 5c changes the direction only by a small angle θ with respect to the passage 6D. When the crutch user 5c passes the intersection 6Dc of the crossroad, the crutch user 5c is detected by the autonomous locomotion apparatus 1, and the autonomous locomotion apparatus 1 moves to take a path L1' (a path near to the left wall 6a) or a path L2' (a path near to the right wall 6b). When the autonomous locomotion apparatus 1 takes the path L1', the crutch user 5c takes a path L1 (a path near to the right wall 6b) so that the autonomous locomotion apparatus 1 and the crutch user 5c can pass each other. On the other hand, when the autonomous locomotion apparatus 1 takes the path L2', the crutch user 5c takes a path L2 (a path near to the left wall 6a) so that the autonomous locomotion apparatus 1 and the crutch user 5c can pass each other. Here, walking times spent by the crutch user 5c on the path L1 and the path L2 from the starting position "START" to an ending position "FINISH" are measured respectively.

The Experiment 5 is repeated twenty times, so that the autonomous locomotion apparatus 1 can randomly take the path L1' or L2' in the Experiment 5.

FIG. 13 shows walking times spent by the crutch user 5c on the path L1 and the path L2 in the Experiment 5. The average times for the path L1 and the path L2 are 4.354 [s] (standard deviation 0.178 [s]) and 4.815 [s] (standard deviation 0.184 [s]), respectively, therefore, the walking time is shorter in the path L1 than that in the path L2. That is, when the crutch user 5c forms a small direction angle with the longitudinal direction of the passage 6D, the path L2 is the easier path for the crutch user 5c to avoid the autonomous locomotion apparatus 1 than the path L1.

From the Experiment 5, it is understood that the path L1 is an easier path for the crutch user 5c to avoid the autonomous locomotion apparatus 1 than the path L2 is because the travel distance is shorter in the path L1 and the angle of direction change θ is smaller in the path L1 than that in the path L2. Therefore, in that case, when the autonomous locomotion apparatus 1 takes the path L1', the crutch user 5c accordingly takes the easy path to avoid the autonomous locomotion apparatus <Experiment 6: An Experiment in the Case where the Crutch User 5c Walks on Crutches on Paths of Various Degrees of Curvature>

Figure 14A:
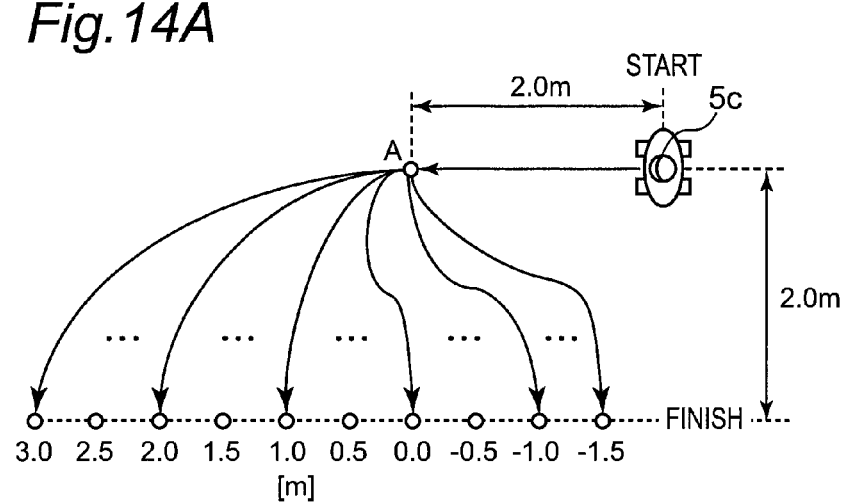
FIG. 14A is a view illustrating <Experiment 6: an experiment in the case where a crutch user walks on crutches on paths of various degrees of curvature>.

FIG. 14A is a view illustrating conditions for the Experiment 6.

The crutch user 5c starts moving from the starting position "START" directly to a point A leftward at first. Then at the point A, the crutch user 5c changes the direction by turning left and starts for a goal at the ending position "FINISH". At this moment, the goal position is shifted in the transverse direction in FIG. 14A by a predetermined interval for the purpose of creating paths of various degrees of curvature from the point A to the ending position "FINISH" (goal). Walking times spent by the crutch user 5c from the starting position "START" to the respective goals at the ending position "FINISH" are measured respectively.

Figure 14B:
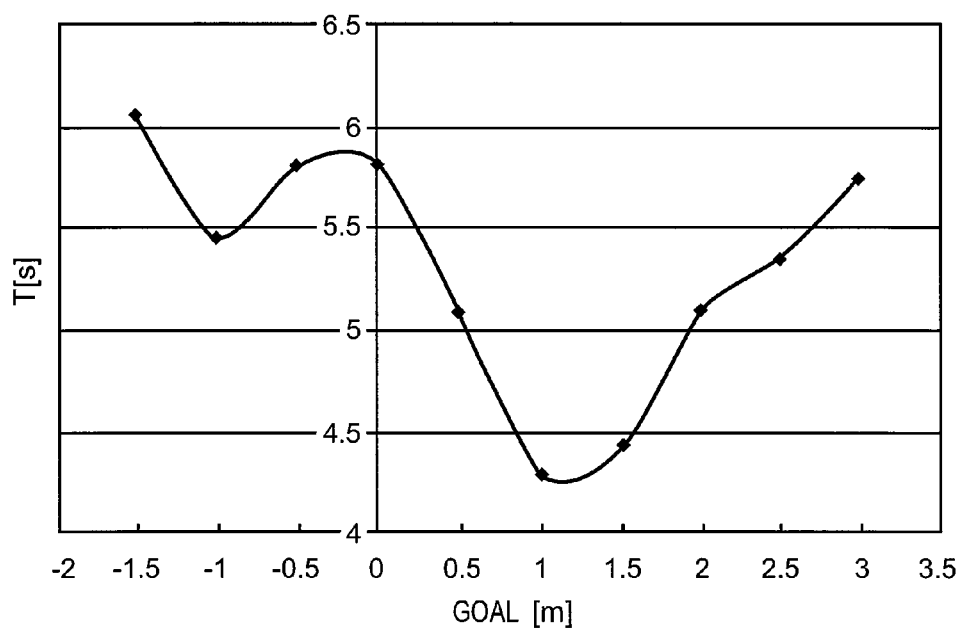
FIG. 14B is a view showing a graph plotting the results of <Experiment 6: an experiment in the case where a crutch user walks on crutches on the paths of various degrees of curvature>.

FIG. 15 shows walking times spent by the crutch user 5c on the respective paths in the Experiment 6. The walking times on the respective paths toward the goal positions are plotted in FIG. 14B. The path from the point A to the rightmost goal at −1.5 m has the largest angle of direction change among the paths. When the goal is shifted to the left from the rightmost goal at −1.5 m to the goal at 1.0 m in FIG. 14A, the angle of direction change becomes smaller and the walking time becomes shorter. However, when the goal is further shifted to the left stepwise after the goal at 1.0 m, the travel distance becomes longer, therefore, the walking time turns to be longer again. The walking time is the shortest at the goal at 1.0 m. That is, from the Experiment 5, it is understood that the easiness of direction change based on the movement attribute of the crutch user 5c and the travel distance need to be taken into account in planning the easiest path for the person 5 to avoid the autonomous locomotion apparatus 1.

<Experiment 7: An Experiment in the Case where an Able-Bodied Person 5a Forms a Large Direction Angle with the Longitudinal Direction of a Passage 6E when the Able-Bodied Person 5a is Detected>

Figure 16:
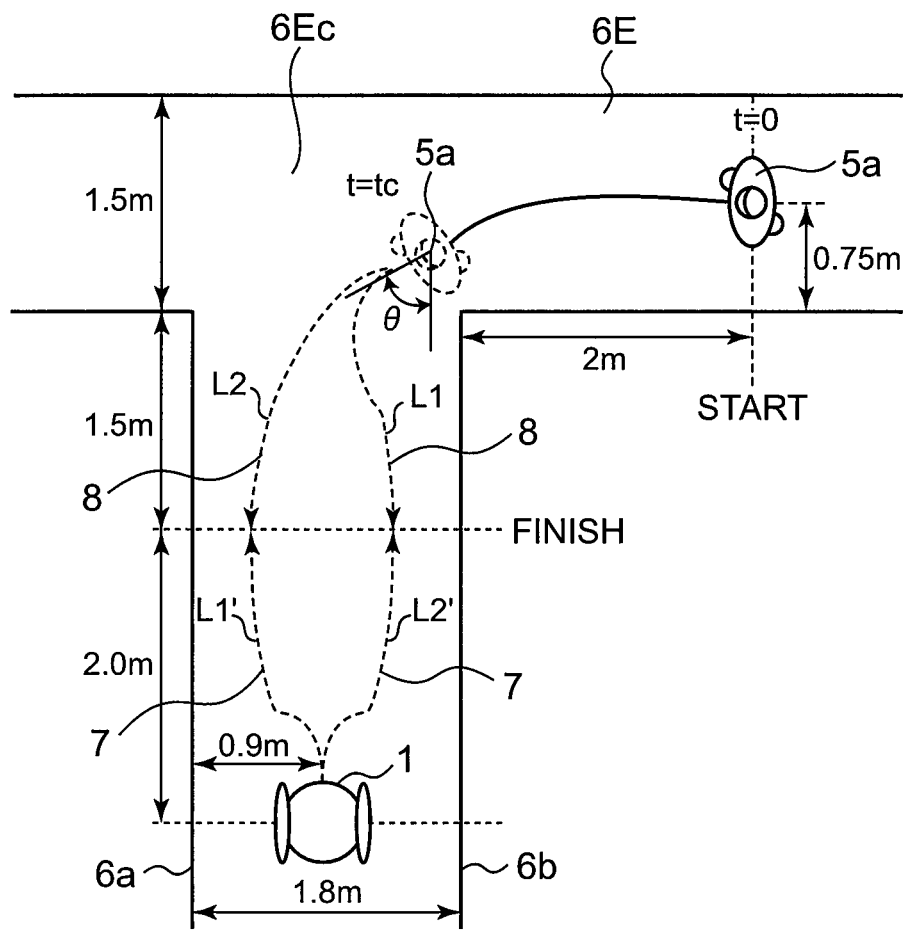
FIG. 16 is a view illustrating <Experiment 7: an experiment in the case where an able-bodied person forms a large direction angle with a passage when the able-bodied person is detected>.

FIG. 16 is a view illustrating conditions for the Experiment 7.

In the passage 6E, the able-bodied person 5a starts moving from a starting position "START" toward an intersection 6Ec of the T-junction, while the autonomous locomotion apparatus 1 is on standby at first. The able-bodied person 5a turns to the left at the intersection 6Ec of the T-junction. When the able-bodied person 5a appears at the intersection 6Ec of the T-junction, the able-bodied person 5a is detected by the autonomous locomotion apparatus 1, and the autonomous locomotion apparatus 1 moves to take a path L1' (a path near to the left wall 6a) or a path L2' (a path near to the right wall 6b). When the autonomous locomotion apparatus 1 takes the path L1', the able-bodied person 5a takes a path L1 (a path near to the right wall 6b) so that the autonomous locomotion apparatus 1 and the able-bodied person 5a can pass each other. On the other hand, when the autonomous locomotion apparatus 1 takes the path L2', the able-bodied person 5a takes a path L2 (a path near to the left wall 6a) so that the autonomous locomotion apparatus 1 and the able-bodied person 5a can pass each other. Here, walking times spent by the able-bodied person 5a on the path L1 and the path L2 from the starting position "START" to an ending position "FINISH" are measured respectively.

The Experiment 7 is repeated twenty times, so that the autonomous locomotion apparatus 1 can randomly take the path L1' or L2' in the Experiment 7.

FIG. 17 shows walking times spent by the able-bodied person 5a on the path L1 and the path L2 in the Experiment 7. The average times for the path L1 and the path L2 are 3.250 [s] (standard deviation 0.140 [s]) and 3.692 [s] (standard deviation 0.130 [s]), respectively, therefore, the walking time is the shorter in the path L1. That is, even though the able-bodied person 5a forms a large direction angle with the longitudinal direction of the passage 6E, the path L2 is the easier path for the able-bodied person 5a to avoid the autonomous locomotion apparatus 1 than the path L1.

The able-bodied person 5a does not have difficulty in performing the direction change. Therefore, from the Experiment 7, it is understood that the path L1 is the easier path for the able-bodied person 5a to avoid the autonomous locomotion apparatus 1 than the path L2 is because the travel distance is shorter in the path L1 than that in the path L2 even though the angle of direction change θ in the path L1 is larger than that in the path L2. Therefore, in that case, when the autonomous locomotion apparatus 1 takes the path L1', the able-bodied person 5a accordingly takes the easy path to avoid the autonomous locomotion apparatus 1.

The present invention developed on the basis of the results of the <Experiment 1> to <Experiment 7> will be described together with an embodiment below.

An embodiment of the present invention will be described below with reference to the drawings.

(First Embodiment)

FIGS. 1A and 1B illustrate appearance of an autonomous locomotion apparatus 1 according to the first embodiment of the present invention. The autonomous locomotion apparatus 1 includes an autonomous locomotion apparatus main body (a mobile body) 1a with a left wheel 2a and a right wheel 2b arranged at a lower part of the main body 1a to independently rotate forward and backward, an LRF (Laser Range Finder) sensor 3 as an example of an environment observation means (environment observation unit) fixed to an upper front part of the main body 1a, an RFID (Radio Frequency IDentication) tag reader 4 as an example of a human movement attribute reading means (a human movement attribute reading unit) fixed to an upper front part of the main body 1a, and a control unit 90 arranged inside the main body 1a, and is for autonomously determining a moving path and moving accordingly.

The left wheel 2a and the right wheel 2b are coupled to a left motor 2aM and a right motor 2bM respectively to be independently driven to rotate forward and backward, and cause the autonomous locomotion apparatus 1 to travel back and forth. The autonomous locomotion apparatus 1 can turn to left and right against the back and forth directions by changing the rotational speeds of the left wheel 2a and the right wheel 2b. The LRF sensor 3 and the RFID tag reader 4 will be described in detail later.

Figure 18A:
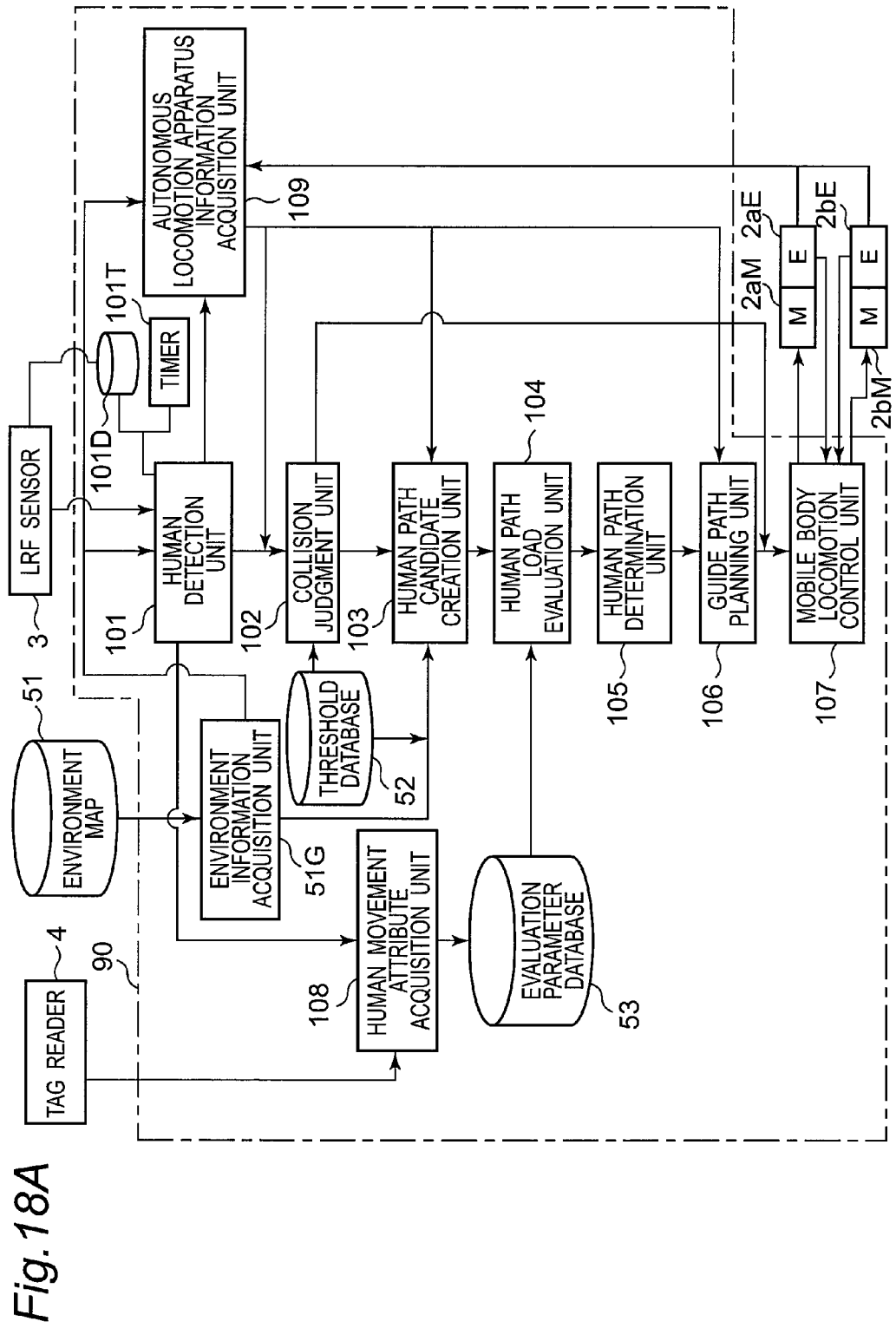
FIG. 18A is a block diagram illustrating a configuration of the autonomous locomotion apparatus according to the first embodiment of the present invention.

FIG. 18A is a block diagram illustrating the autonomous locomotion apparatus 1 according to the present embodiment.

The autonomous locomotion apparatus 1 includes a human information acquisition means (a human information acquisition unit, a human detection means, or a human detection unit) 101, an autonomous locomotion apparatus information acquisition means (an autonomous locomotion apparatus information acquisition unit) 109, a human movement attribute acquisition means (a human movement attribute acquisition unit) 108, a collision judgment means (a collision judgment unit) 102, a human path candidate creation means (a human path candidate creation unit) 103, a human path load evaluation means (a human path load evaluation unit) 104, a human path determination means (a human path determination unit) 105, a guide path planning means (a guide path planning unit) 106, and a mobile body locomotion control means (a mobile body locomotion control unit, a locomotion control means, a locomotion control unit) 107 as a control unit 90. The autonomous locomotion apparatus 1 includes an environment map database 51 other than the above described constituent elements, but it may be configured to acquire information stored in the environment map database 51 from a database outside of the autonomous locomotion apparatus 1 via an input/output interface and a communication line by using an environment information acquisition means (environment information acquisition unit) 51G.

The environment map database 51 stores an environment map 51A of environment where the autonomous locomotion apparatus 1 travels. Passages for the autonomous locomotion apparatus 1 to travel and obstacles in the environment in which the autonomous locomotion apparatus 1 travels are stored in the environment map 51A. That is, the environment map database 51 has previously stored the environment map 51A of a place in which the autonomous locomotion apparatus 1 travels and coexists with a person 5, and supplies data of the environment map 51A to the environment information acquisition means 51G. The obstacles in the environment map 51A may be classified into two categories: the moving obstacles (for example, a person 5) and the static obstacles (for example, a wall 51*w*), and the coordinates of the wall 51*w* which is a static obstacle and defines the passage 6 are contained in the environment map 51A.

The autonomous locomotion apparatus information acquisition means 109 acquires the position of the autonomous locomotion apparatus 1 in the environment in which the autonomous locomotion apparatus 1 travels and the speed of the autonomous locomotion apparatus 1 based on self-position estimation information of the autonomous locomotion apparatus 1 from the human detection means 101 to be described later, the environment map 51A stored in the environment map database 51, and information from encoders 2*a*E and 2*b*E for the left and right motors 2*a*M and 2*b*M for the left wheel 2*a* and the right wheel 2*b*.

The autonomous locomotion apparatus information acquisition means 109 acquires the speed of the autonomous locomotion apparatus 1 by using odometry information maintained in the autonomous locomotion apparatus 1. That is, the autonomous locomotion apparatus information acquisition means 109 calculates the travel distance and the direction by multiplying the turning angles by the turning angle velocities of the left wheel 2*a* and the right wheel 2*b* based on the information from the encoders 2*a*E and 2*b*E for the left and right motors 2*a*M and 2*b*M for the left wheel 2*a* and the right wheel 2*b*.

The environment observation means observes environment information about the surroundings of the autonomous locomotion apparatus 1 by a predetermined period of time based on information from a timer 101T, and records the information in an environment information database 101D (see step S202 of FIG. 19A to be described later). In the first embodiment, the environment information observed by one LRF sensor 3, which is an example of the environment observation means, is acquired. The environment information includes information about the person 5 in the surroundings of the autonomous locomotion apparatus 1. Here, as the environment observation means, only one sensor is enough but sensor fusion using two or more sensors may be adopted to improve the measurement accuracy. The environment observation means is not limited to the LRF sensor 3 and may be a sensor such as a millimeter-wave sensor, an ultrasonic sensor, or a stereo-camera.

Figure 20A:
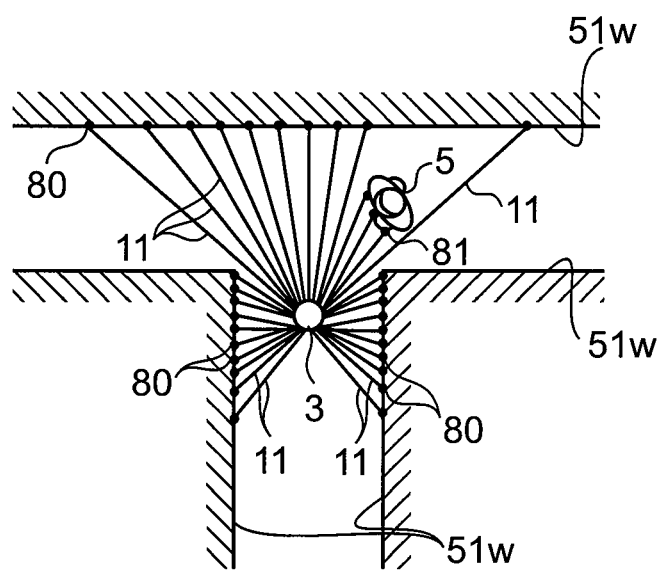
FIG. 20A is an explanatory view showing a state where an LRF (Laser Range Finder) sensor of the autonomous locomotion apparatus according to the first embodiment of the present invention measures a traveling environment and an obstacle.
Figure 20B:
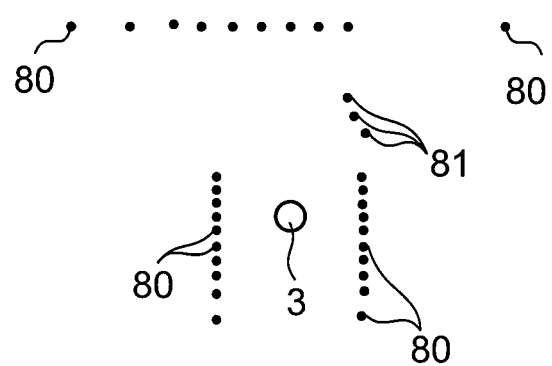
FIG. 20B is an explanatory view of data acquired by the LRF sensor of the autonomous locomotion apparatus according to the first embodiment of the present invention.

In the first embodiment, the human detection means 101 uses information from the LRF sensor 3 of FIGS. 1A and 1B to acquire the position of the autonomous locomotion apparatus 1 in the traveling environment of the autonomous locomotion apparatus 1. The human detection means 101 compares the information from the LRF sensor 3 with the information of the environment map 51A of the environment map DB 51, and finds the position of the autonomous locomotion apparatus 1 in the world coordinate system 54 of the environment map. The procedure will be described in detail below. As illustrated in FIG. 20A, while the autonomous locomotion apparatus 1 is traveling, the LRF sensor 3 irradiates a plurality of laser beams 11 toward the surroundings of the autonomous locomotion apparatus 1 every predetermined period of time to measure a distance from each obstacle in the surroundings. In the first embodiment, it is assumed that the LRF sensor 3 has the measurable range of 270 degrees as an example and irradiates the laser beams 11 at 0.25 degree intervals as an example. The laser beam 11 for each angle measures a distance from an obstacle placed at the angle. That is, in FIGS. 20A and 20B, reference numerals 80 represent the spots where the laser beams 11 hit a known obstacle (in this example, the wall 51*w*) and reference numerals 81 represent the spots where the laser beams 11 hit an unknown obstacle (in this example, the person 5) which is not stored in the environment map 51A. The distances from an irradiation hole of the laser beam 11 to these spots are measured by the LRF sensor 3 as the distance to the obstacle in the surroundings. The measured result is the environment information. FIG. 20B shows data acquired by the LRF sensor 3.

From the data acquired by the LRF sensor 3, the human detection means 101 can acquire the shape of the environment in the surroundings of the current position of the autonomous locomotion apparatus 1. The human detection means 101 compares the shape of the environment acquired by the LRF sensor 3, as the shape of the environment in which the autonomous locomotion apparatus 1 is operating, with the environment map 51A which has been previously recorded in the environment map database 51.

Figures 21A, 21B:
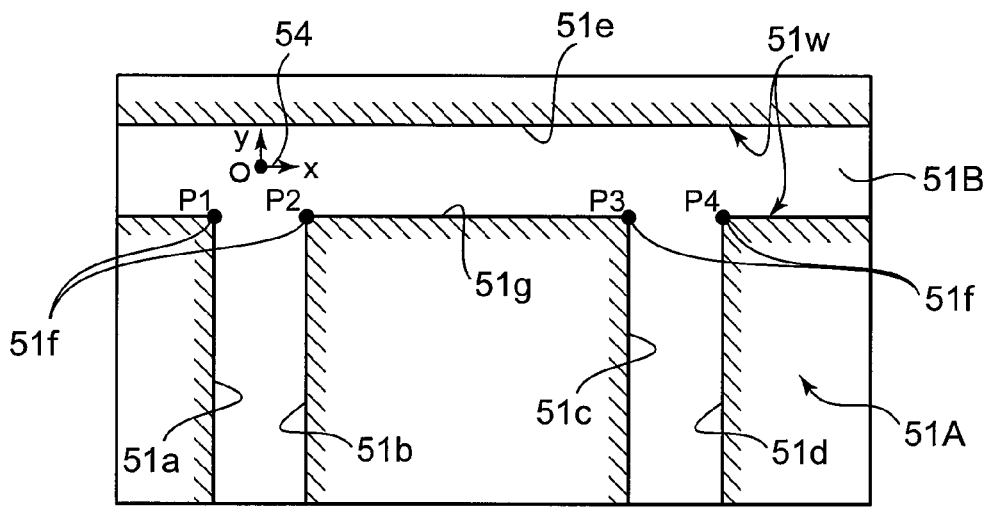
FIG. 21A is a view illustrating an environment map in the autonomous locomotion apparatus according to the first embodiment of the present invention.
FIG. 21B is a view showing contents of a database in the environment map in the autonomous locomotion apparatus according to the first embodiment of the present invention.

FIG. 21A illustrates an example of information of the environment map 51A. For the purpose of storing the information of the environment map 51A into the environment map database 51, position coordinates of land marks such as corners 51*f* of the walls 51*w*, specifically, walls 51*a*, 51*b*, 51*c*, 51*d*, 51*e*, and 51*g*, of a passage 51B are found. For example, in FIG. 21A, the corners 51*f* are denoted by points P1, P2, P3, and P4. Each of the walls 51*a*, 51*b*, 51*c*, 51*d*, 51*e*, and 51*g* is delineated by a line connecting two points such as the points P2 and P3. For example, in FIG. 21A, the wall 51*g* is delineated by the line connecting the points P2 and P3. FIG. 21B shows an example of the database 51 for the environment map 51A. In FIG. 21B, x- and y-coordinates of the points P1, P2, P3, and P4 and information about the line connecting the points P2 and P3 are recorded.

The human detection means 101 repeats translation and rotation of the environment map 51A with respect to the shape of the environment acquired by the LRF sensor 3 to find the best match place between the environment map 51A and the acquired environment shape. The best match place is the position of the autonomous locomotion apparatus 1 in its traveling environment.

Further, the human detection means 101 detects the person 5 in the surroundings of the autonomous locomotion apparatus 1 to acquire the position, the speed, and the direction of travel of the person 5 based on the information from the LRF sensor 3. In the first embodiment, the LRF sensor 3 of FIG. 1A, as an example of the environment observation means, is used as an information source to be input to the human detection means 101. Here, for the environment observation means, as the information source for the human detection means 101, only one sensor is enough but sensor fusion using two or more sensors may be adopted to improve the measurement accuracy. Meanwhile, the environment observation means may also be a sensor such as a millimeter-wave sensor, an ultrasonic sensor, or a stereo-camera.

A method of detecting a person 5 by the human detection means 101 using the LRF sensor 3 of FIG. 1A will be described.

Based on the information acquired by the LRF sensor 3, the human detection means 101 estimates the position of the autonomous locomotion apparatus 1 in the traveling environment of the autonomous locomotion apparatus 1 in the above described manner. The estimation information is output from the human detection means 101 to the autonomous locomotion apparatus information acquisition means 109. Even after the human detection means 101 estimates the position of the autonomous locomotion apparatus 1, distance data which partially does not match the obstacles (the wall 51*w* and the like) in the environment map 51A is detected by the plurality of laser beams 11. As illustrated in FIG. 20B, some laser beams 11 hit the person 5 and are detected as a group of points 81 representing an unknown obstacle which is not in the environment map 51A. The human detection means 101 judges whether the group of points 81 representing an unknown obstacle is always detected at the same position in the world coordinate system 54, while the autonomous locomotion apparatus 1 is traveling.

When the group of points 81 representing an unknown obstacle is always detected at the same position, the human detection means 101 judges that the unknown obstacle is a static obstacle; if not, the human detection means 101 judges that the group of points 81 representing an unknown obstacle is a moving obstacle. After the human detection means 101 judges that the unknown obstacle is a moving obstacle, the human detection means 101 takes into account of the width of the moving obstacle in judging whether the moving obstacle is a person 5 or not. Based on the distance data from the LRF sensor 3, the human detection means 101 estimates the width of the moving obstacle. Assuming that the width of the wheelchair user 5*b* as viewed from the front is about 80 cm and that the width of the able-bodied person 5*a* as viewed from the side is 30 cm, the human detection means 101 estimates that the detected moving obstacle with the width 30 to 80 cm is a person 5. That is, the human detection means 101 previously stores information including a width of the wheelchair user 5*b* as viewed from the front and a width of the able-bodied person 5*a* as viewed from the side in an internal storage unit.

When the person 5 is detected by the human detection means 101, the position, the speed, and the direction of travel of the person 5 can be acquired in the human detection means 101 as information about the person 5. Based on the self-position of the autonomous locomotion apparatus 1 and the distance from the person 5 measured by the LRF sensor 3, the position of the person 5 is estimated in the human detection means 101. The time derivative of the position of the person 5 is calculated in the human detection means 101 as the speed of the person 5. The vector of speed of the person 5 is acquired in the human detection means 101 as the direction of travel of the person 5.

Figures 22, 23:
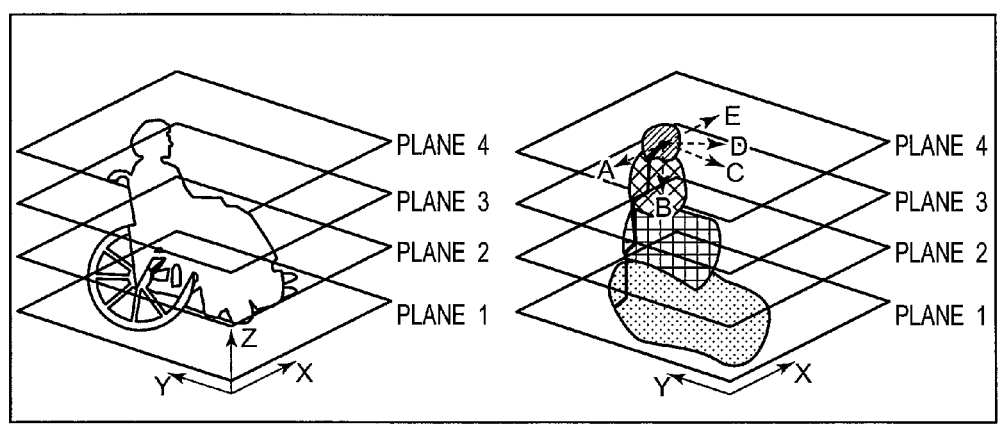
FIG. 22 is a view showing examples of a judgment result from a human movement attribute acquisition means in the autonomous locomotion apparatus according to the first embodiment of the present invention.
FIG. 23 is a view illustrating a wheelchair user detection method using a stereo-camera.

The human movement attribute acquisition means 108 determines the attribute of person's movement based on mobility capability of the person 5 (the easiness of movement of the person 5) according to the information including the position and the like of the person 5 from the human detection means 101 and information from the tag reader 4. The attribute of person's movement based on mobility capability of the person (the human movement attribute) is the attribute which represents a difference in easiness of movement of the person 5 (information about the direction change of the person 5) for each direction of movement (direction of travel) of the person 5. For example, the attribute is represented by the able-bodied person 5*a* who can move promptly in omni-direction, and the wheelchair user 5*b* and the crutch user 5*c* who have troubles with the direction change and takes a long time in changing their directions. Further, the attribute of person's movement includes, for example, a person who is walking with intravenous feeding equipment, a walker user (a person walking with a walker), and a workman pushing a handcart. FIG. 22 shows examples of the attribute based on mobility capability of the person 5.

In the first embodiment, the RFID tag reader 4 is used as an example of the human movement attribute reading means of the human movement attribute acquisition means 108. For example, an ID dedicated to wheelchair is previously registered to an internal storage unit of an RFID tag and the RFID tag is attached to the wheelchair. When the autonomous locomotion apparatus 1 and the wheelchair user 5*b* pass each other, the autonomous locomotion apparatus 1 can have the RFID tag reader 4 read the ID dedicated to the wheelchair from the RFID tag and cause the human movement attribute acquisition means 108 to acquire the human movement attribute for the wheelchair user 5*b*. The other attributes can be acquired in the similar method.

Meanwhile, the human movement attribute acquisition means 108 may also be a stereo-camera. JP 2007-272474 A (Patent Literature 2) discloses a wheelchair user detection method using a stereo-camera. As illustrated in FIG. 23, the method can acquire a human movement attribute by splitting three-dimensional information of a person acquired by a stereo-camera into several planes, and performing image processing on the three-dimensional information by using an un-shown image processing unit to judge whether the three-dimensional shape appears to be a wheelchair user or not.

Based on the information about the human movement attribute acquired by the human movement attribute acquisition means 108, the human movement attribute acquisition means 108 determines each of the weight applied to the load due to travel distance and the weight applied to the load due to person's easiness of direction change by referring to an evaluation parameter database 53, and outputs the weights to the human path load evaluation means 104.

The collision judgment means 102 judges presence or absence of probability of collision between the person 5 detected by the human detection means 101 and the autonomous locomotion apparatus 1 based on the information from the autonomous locomotion apparatus information acquisition means 109 and the human detection means 101, and judges whether the person 5 and the autonomous locomotion apparatus 1 will collide with each other soon (within a predetermined time).

In order to cause the collision judgment means 102 to judge presence or absence of probability of collision between the detected person 5 and the autonomous locomotion apparatus 1, the target person 5 is determined by the collision judgment means 102 using the expression (1) below.

$$d(0) = \|\vec{x}_p(0) - \vec{x}_r(0)\| \leq d1_{th} \tag{1}$$

In the above expression, $x_r(0)$ and $x_p(0)$ are respectively the positions of the autonomous locomotion apparatus 1 and the person 5 at the moment when the autonomous locomotion apparatus 1 detects the person 5. The person 5 who meets the condition that a relative distance d(0) between the autonomous locomotion apparatus 1 and the person 5 at the moment when the autonomous locomotion apparatus 1 detects the person 5 is a predetermined distance $d1_{th}$ or less is considered to be the target person 5. In the first embodiment, the predetermined distance $d1_{th}$ is 10 m.

Figure 24:
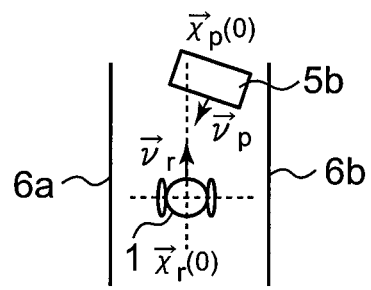
FIG. 24 is a view illustrating positional relationship between the autonomous locomotion apparatus, which is detecting a person, and the person in the autonomous locomotion apparatus according to the first embodiment of the present invention.

Next, the time function of the relative distance between the autonomous locomotion apparatus 1 and the person 5 is calculated by the collision judgment means 102 using the expression (2) below based on the position $x_r(0)$ and the speed $v_r$ of the autonomous locomotion apparatus 1 and the position $x_p(0)$ and the speed $v_p$ of the person 5 at the moment when the autonomous locomotion apparatus 1 detects the person 5. FIG. 24 illustrates positional relationship between the autonomous locomotion apparatus 1 and the person 5 at the moment when the autonomous locomotion apparatus 1 detects the person 5.

$$d(t) = \|\vec{x}_p(t) - \vec{x}_r(t)\| = \|(\vec{x}_p(0) + \vec{av}_p t) - (\vec{x}_r(0) + \vec{v}_r t)\| \quad (2)$$

In the above function, it is assumed that both the autonomous locomotion apparatus 1 and the person 5 respectively move ahead at their speeds both the autonomous locomotion apparatus 1 and the person 5 had when the autonomous locomotion apparatus 1 detected the person 5. In the above expression, d(t) is the relative distance between the autonomous locomotion apparatus 1 and the person 5 at the time t, and $x_r(t)$ and $x_p(t)$ are respectively the positions of the autonomous locomotion apparatus 1 and the person 5 at the time t.

As shown in the expression (3) below, the time function d(t) of the relative distance is differentiated and the time t when the differential value is zero is found, by the collision judgment means 102. The time is assumed to be $T_{min}$.

$$\left.\frac{d(d(t))}{dt}\right|_{t=T_{min}} = 0 \quad (3)$$

The relative distance $d_{min}$ at the time $T_{min}$ is found by the collision judgment means 102 using the expression (4) below. The relative distance $d_{min}$ represents the distance of closest point of approach between the autonomous locomotion apparatus 1 and the person 5.

$$d_{min} = d(t=T_{min}) \quad (4)$$

As shown in the expression (5) below, when the distance of closest point of approach $d_{min}$ is a predetermined distance $d2_{th}$ or less, the collision judgment means 102 judges that there is the probability of collision between the autonomous locomotion apparatus 1 and the person 5. In contrast, when the distance of closest point of approach $d_{min}$ is larger than the predetermined distance $d2_{th}$, the collision judgment means 102 judges that there is not the probability of collision between the autonomous locomotion apparatus 1 and the person 5.

$$d_{min} \leq d2_{th} \quad (5)$$

Here, it is assumed that $d2_{th}$ is a distance of the sum of the radius of the autonomous locomotion apparatus 1 and the radius of the person 5 with an additional distance for maintaining a room (space) for the autonomous locomotion apparatus 1 and the person 5 to safely pass each other. In the first embodiment, 20 cm as a half of a step length of the person 5 is assumed as the distance for the safe passing. In the first embodiment, since the radius of the autonomous locomotion apparatus 1 is 30 cm and the radius of the wheelchair user 5b, which is the largest among those of the movement attributes, is 40 cm for example, the distance $d2_{th}$ is 90 cm.

When the collision judgment means 102 judges that there is the probability of collision, the time $T_{min}$ in the judgment is assumed to be a predicted time left for the collision. As shown in the expression (6) below, when the predicted time left for the collision $T_{min}$ is a predetermined time $T_{th}$ or less, the collision judgment means 102 judges that the collision will occur immediately. When the predicted time left for the collision $T_{min}$ is larger than the predetermined time $T_{th}$, the collision judgment means 102 judges that the collision will not occur immediately.

$$T_{min} \leq T_{th} \quad (6)$$

As an example of the first embodiment, the predetermined time $T_{th}$ is assumed to be 1 s.

Incidentally, the predetermined distance $d1_{th}$, the predetermined distance $d2_{th}$, the predetermined time $T_{th}$ which are thresholds are respectively stored in a threshold database 52, and referenced by the collision judgment means 102 as required. These thresholds are determined from pre-experiments.

Figure 25:
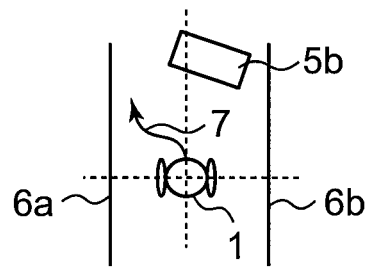
FIG. 25 is a view illustrating an avoiding operation of the autonomous locomotion apparatus which will immediately collide with a person in the autonomous locomotion apparatus according to the first embodiment of the present invention.

When the collision judgment means 102 judges that the autonomous locomotion apparatus 1 and the person 5 will immediately collide with each other, the mobile body locomotion control means 107 causes the autonomous locomotion apparatus 1 to immediately perform an avoiding operation in which the autonomous locomotion apparatus 1 moves to the place where the person 5 is not present. For example, as illustrated in FIG. 25, when the person 5 is on the right side of the autonomous locomotion apparatus 1 based on the coordinate system on the autonomous locomotion apparatus 1, the mobile body locomotion control means 107 causes the autonomous locomotion apparatus 1 to move to the left.

When it is judged that there is the probability of collision between the person 5 and the autonomous locomotion apparatus 1 but the collision will not occur immediately based on the information from the autonomous locomotion apparatus information acquisition means 109 and the information from the collision judgment means 102 (at least the information from the human detection means 101), the human path candidate creation means 103 creates a plurality of candidate paths for having the person 5 move along. Specifically, the human path candidate creation means 103 determines a goal of the candidate paths based on a predicted time $T_{min}$ left for the autonomous locomotion apparatus 1 and the person 5 to collide with each other and the speed of the person 5.

Figure 26:
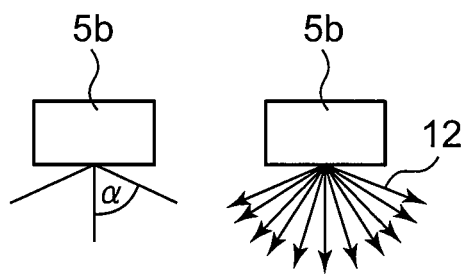
FIG. 26 is a view illustrating a region for a person to avoid the autonomous locomotion apparatus according to the first embodiment of the present invention.

As illustrated in FIG. 26, the human path candidate creation means 103 has previously defined a sector of angle α in the current traveling direction of the person 5 as the region for the person 5 to avoid the autonomous locomotion apparatus 1 regardless of the movement attribute of the person 5. In the first embodiment, the angle α is 90 degrees, for example. The human path candidate creation means 103 further divides the region for the person 5 to avoid the autonomous locomotion apparatus 1 into smaller parts, and enumerates the candidate paths for having the person 5 move along. In the first embodiment, the human path candidate creation means 103 divides the region for the person 5 to avoid the autonomous locomotion apparatus 1 at 2.5 degree intervals, for example. Arrows shown in FIG. 26 indicate the directions for the person 5 to avoid the autonomous locomotion apparatus 1 (the directions of the candidate paths for having the person 5 move along) 12.

Figure 27:
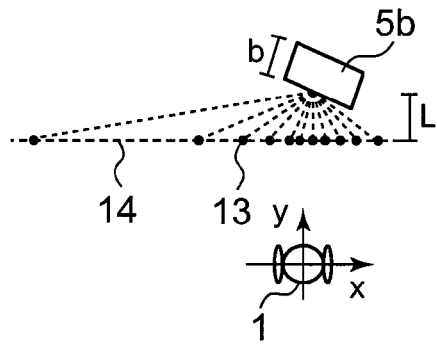
FIG. 27 is a view illustrating a method of setting a goal of a candidate path for a person to move along in the autonomous locomotion apparatus according to the first embodiment of the present invention.

Next, the human path candidate creation means 103 sets goals 13 of the candidate paths for having the person 5 move along in the respective directions 12. The human path candidate creation means 103 sets, as the goals 13, the points along the y-coordinate of the coordinate system on the autonomous locomotion apparatus 1, on which the autonomous locomotion apparatus 1 and the person 5 would collide with each other if the autonomous locomotion apparatus 1 and the person 5 respectively move ahead at their current speeds. In FIG. 27, the destined y-coordinate is indicated by a line (a line for determining the goals of the candidate paths for having the person 5 move along) 14. The position of the line 14 is at a distance L in the vertical direction from the current position of the person 5. The distance L is determined by the human path candidate creation means 103 using the expression (7) below.

$$L=\max\{v_{py} \times T_{min}, b\} \quad (7)$$

In the above expression, $v_{py}$ is the y-component of the speed of the person 5, and b is the width of the person 5 as viewed from the side. In the first embodiment, it is assumed that the diameter of the able-bodied person 5a represented in a two-dimensional schematic diagram is 60 cm and the width b of the able-bodied person 5a represented in the two-dimensional schematic view as viewed from the side is 60 cm, for example. It is assumed that the diameter of the wheelchair user 5b represented in the two-dimensional schematic view is 80 cm and the width b of the wheelchair user 5b represented in the two-dimensional schematic view as viewed from the side is 80 cm. The time $T_{min}$ is the value calculated using the expression (3). Incidentally, the width b is stored in the threshold database 52.

It is assumed that the points of intersections of the line 14 at the distance L from the person 5 with the directions 12 for the person 5 to avoid the autonomous locomotion apparatus 1 are the goals 13 of the candidate paths.

Meanwhile, the human path candidate creation means 103 may generate the goals 13 of the candidate paths by dividing the line 14 at the distance L at regular intervals instead of dividing the sector of angle α as the region for the person 5 to avoid the autonomous locomotion apparatus 1 into angles of equal degrees.

Next, valid candidate paths (along which the person 5 can move) need to be exclusively extracted from among the goals 13 of the candidate paths by the human path candidate creation means 103, since one or more of the goals 13 of the candidate paths are impossible for the person 5 to access. Based on constraints including environmental conditions, the valid candidate paths are exclusively extracted by the human path candidate creation means 103.

Figure 28A:
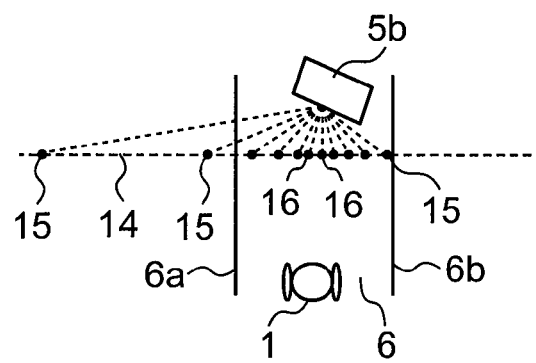
FIG. 28A is a view illustrating a method of extracting a valid candidate path in the autonomous locomotion apparatus according to the first embodiment of the present invention.
Figure 28B:
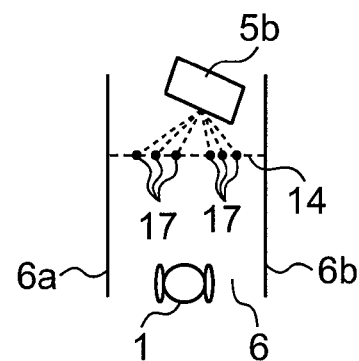
FIG. 28B is a view illustrating an extracted candidate path in the autonomous locomotion apparatus according to the first embodiment of the present invention.

FIG. 28A illustrates the extraction method. According to an environmental constraint condition that the person 5 cannot access goals of candidate paths outside of the passage 6, such impossible candidate paths 15 for the person to move along are eliminated by the human path candidate creation means 103. Since the movement of the person 5 to the goal of candidate paths in the middle of the passage 6 cannot ensure a room (space) for the autonomous locomotion apparatus 1 and the person 5 to pass each other according to a physical condition concerning relationship between the width of the passage 6, the width of the autonomous locomotion apparatus 1, and the width of the person 5, such impossible candidate paths 16 for the person 5 to move along are eliminated by the human path candidate creation means 103. The rest of the candidate paths are determined valid by the human path candidate creation means 103. FIG. 28B illustrates six goals 17 of the candidate paths remaining valid. Information about the candidate paths and goals extracted as valid by the human path candidate creation means 103 in that manner is output from the human path candidate creation means 103 to the human path load evaluation means 104.

Based on the information from the human path candidate creation means 103 and the movement attribute of the person 5 determined and the weight according to the movement attribute by the human movement attribute acquisition means 108, the human path load evaluation means 104 evaluates the movement load which represents the easiness of movement of the person 5 for each candidate path created by the human path candidate creation means 103. The human path load evaluation means 104 makes comprehensive evaluation for the movement load with the load due to travel distance (load of travel distance) and the load due to person's easiness of direction change (load of person's direction change). A specific evaluation formula used in the human path load evaluation means 104 will be defined as the expression (8) below.

$$E = w_{forward} L_{AB} + w_{direction} \theta_r \quad (8)$$

In the above expression, E represents the movement load. The first and second terms represent the load due to travel distance and the load due to person's easiness of direction change, respectively. $w_{forward}$ and $w_{direction}$ represent the weight applied to the load due to travel distance and the weight applied to the load due to person's easiness of direction, respectively. $L_{AB}$ represents the length of the candidate path and $\theta_r$ represents the angle of the direction change. The angle of the direction change is calculated by the human path load evaluation means 104 as a difference in angle between the direction taken by the person 5 at the current position 18 of the person 5 and the direction of the valid goal 17 from the current position 18 of the person 5 (see FIGS. 29A and 29B).

The weight applied to the load due to travel distance $W_{forward}$ and the weight applied to the load due to person's easiness of direction change $W_{direction}$ are determined by the human path load evaluation means 104 based on the information about the movement attribute of the person 5 which is evaluated by the human movement attribute acquisition means 108. Since the wheelchair user 5b has troubles with the direction change and takes a long time in changing his direction, the human path load evaluation means 104 increases the weight $W_{direction}$ for the wheelchair user 5b. On the other hand, since the able-bodied person 5a has no trouble with the direction change, the human path load evaluation means 104 decreases the weight $W_{direction}$ for the able-bodied person 5a. That is, for the able-bodied person 5a, the human path load evaluation means 104 only needs to take into account of the load due to travel distance. FIG. 30 lists examples of the weight $W_{forward}$ and the weight $W_{direction}$ for each movement attribute. Meanwhile, $w_{forward}$ and $w_{direction}$ are previously stored in the evaluation parameter database 53.

Figures 31A, 31B:
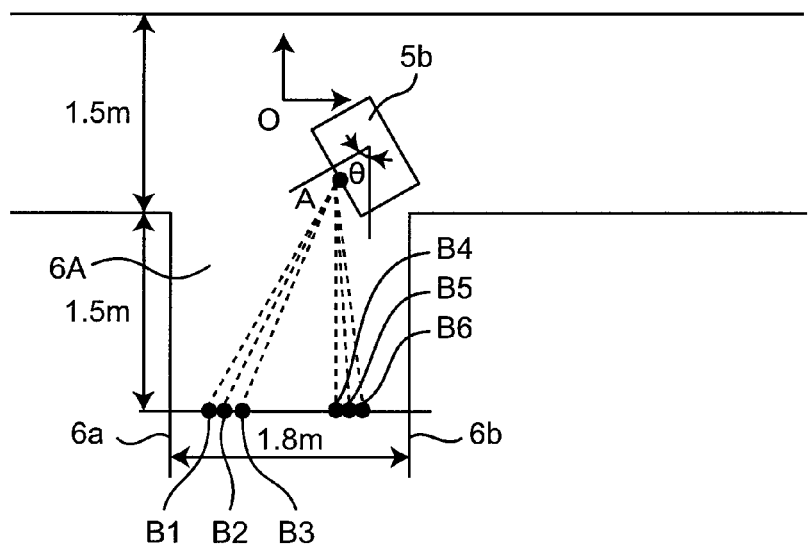
FIG. 31A is a view illustrating an example of a movement load evaluation by the autonomous locomotion apparatus according to the first embodiment of the present invention in the case where a wheelchair user forms a large direction angle with a passage.
FIG. 31B is a view listing calculated results of a movement load in the autonomous locomotion apparatus according to the first embodiment of the present invention in the case where a wheelchair user forms a large direction angle with a passage.
Figures 32A, 32B:
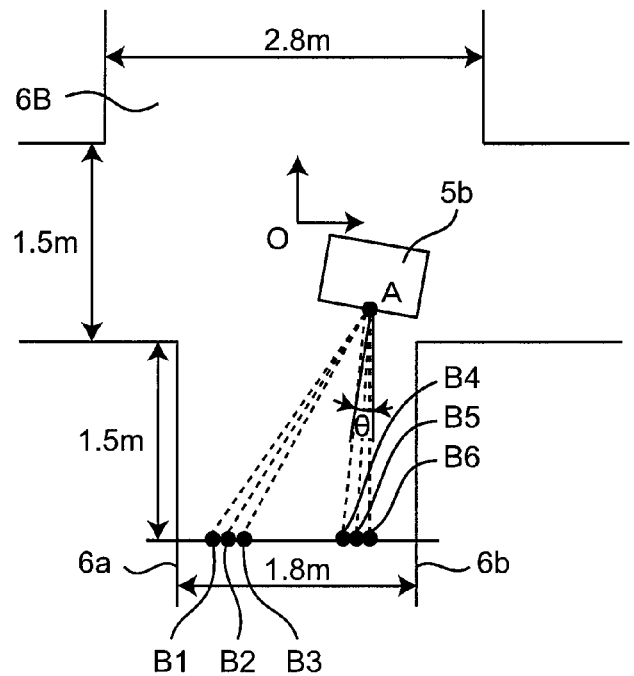
FIG. 32A is a view illustrating an example of a movement load evaluation by the autonomous locomotion apparatus according to the first embodiment of the present invention in the case where a wheelchair user forms a small direction angle with a passage.
FIG. 32B is a view listing calculated results of a movement load in the autonomous locomotion apparatus according to the first embodiment of the present invention in the case where a wheelchair user forms a small direction angle with a passage.

FIGS. 31A and 32A illustrate examples of movement load evaluation for the wheelchair user 5b. Here, it is assumed that the line 14 at the distance L from the person 5 is divided at 5 cm intervals so that the goals 13 of the plurality of candidate paths are generated. A point A is the current position of the wheelchair user 5b and points B1 to B6 are the goals 17 of the valid candidate paths. The human movement attribute acquisition means 108 uses the weight $w_{forward}$ and the weight $w_{direction}$ for the wheelchair user 5b listed in FIG. 30 which are stored in the evaluation parameter database 53 in making the evaluation.

FIG. 31A illustrates a case where the wheelchair user 5b forms a large direction angle θ with the longitudinal direction of the passage 6A. Here, the direction angle θ with the longitudinal direction of the passage 6A is 68.53 degrees, for example. FIG. 31B shows calculations of the movement loads for the respective candidate paths.

FIG. 32A illustrates a case where the wheelchair user 5b forms a small direction angle θ with the longitudinal direction of the passage 6B. Here, the direction angle θ with the longitudinal direction of the passage 6B is 15.20 degrees, for example. FIG. 32B shows calculations of the movement loads for the respective candidate paths.

The human path determination means 105 determines a path for having the person 5 move along based on the movement load calculated by the human path load evaluation means 104. The human path determination means 105 selects a candidate path which imposes a minimum movement load on the person 5 as the easiest path for the person 5 to avoid the autonomous locomotion apparatus 1. The human path determination means 105 determines that the selected path is the path 21 for having the person 5 move along.

FIG. 31B lists calculated results of the movement load in the case where the wheelchair user 5b forms a large direction angle θ with the passage 6A, showing that the movement load for the candidate path toward the point B1 is the smallest movement load. That is, the path to move near to the left wall 6a of the passage 6A for avoiding the autonomous locomotion apparatus 1 is the easiest path for the wheelchair user 5b to avoid the autonomous locomotion apparatus 1. That agrees with the result of <Experiment 1> illustrated in FIG. 4.

FIG. 32B lists calculated results of the movement load in the case where the wheelchair user 5b forms a small direction angle θ with the passage 6B, showing that the movement load for the candidate path toward the point B6 is the smallest movement load. That is, the path to move near to the right wall 6b of the passage 6B for avoiding the autonomous locomotion apparatus 1 is the easiest path for the wheelchair user 5b to avoid the autonomous locomotion apparatus 1. That agrees with the result of <Experiment 2> illustrated in FIG. 6.

The human path determination means 105 outputs the selected path to the guide path planning means 106.

The guide path planning means 106 plans a path for the autonomous locomotion apparatus 1 so as to guide the person 5 to the path 21 for having the person 5 move along based on the information from the autonomous locomotion apparatus information acquisition means 109 and the human path determination means 105. That is, the guide path planning means 106 determines a path 23 for guiding the person 5 to the path 21 for having the person 5 move along which has been determined by the human path determination means 105.

Figure 33A:
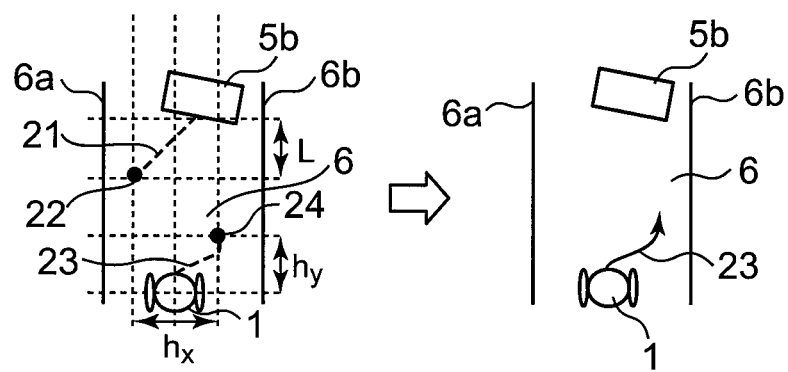
FIG. 33A is a view illustrating a method taken by the autonomous locomotion apparatus according to the first embodiment of the present invention to determine a path for the autonomous locomotion apparatus to guide a person.
Figure 33B:
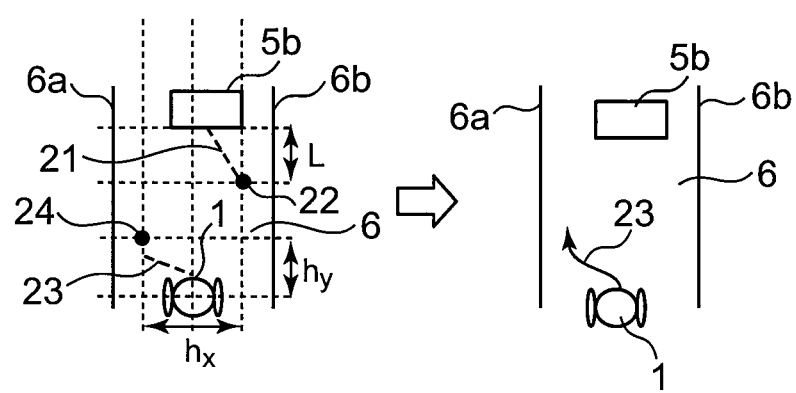
FIG. 33B is a view illustrating a method taken by the autonomous locomotion apparatus according to the first embodiment of the present invention to determine a path for the autonomous locomotion apparatus to guide a person.
Figure 34A:
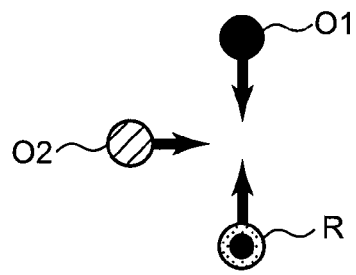
FIG. 34A is a view illustrating an outline of a conventional approach.
Figure 34B:
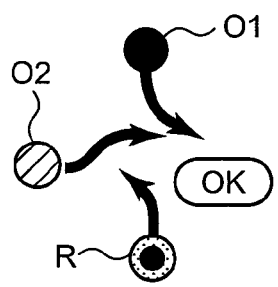
FIG. 34B is a view illustrating an outline of the conventional approach.
Figure 35:
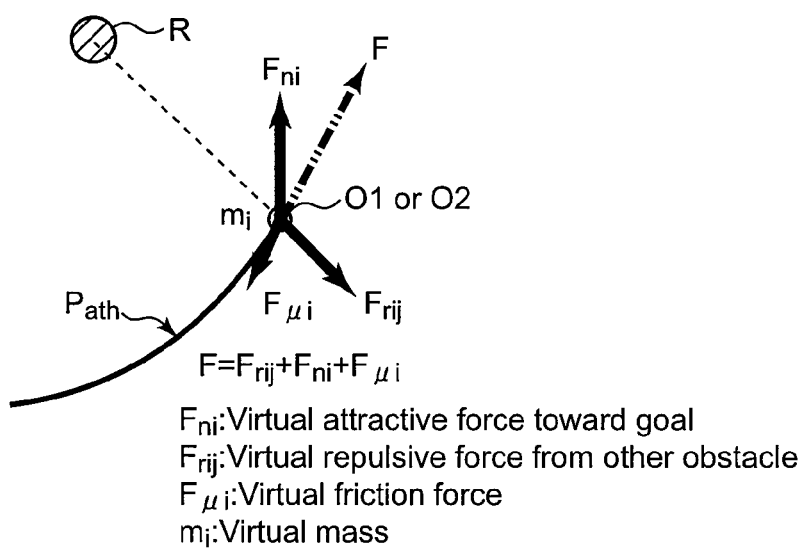
FIG. 35 is a view illustrating a prediction of a path for a person based on a potential method in the conventional approach.
Figure 36A:
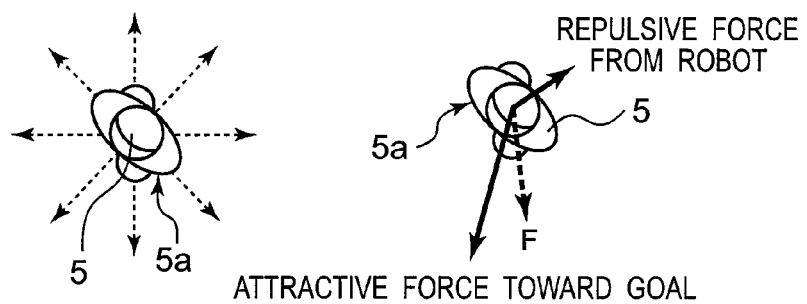
FIG. 36A is a view illustrating an example of the case where a person's behavioral principle in the conventional approach is applied to an able-bodied person.
Figure 36B:
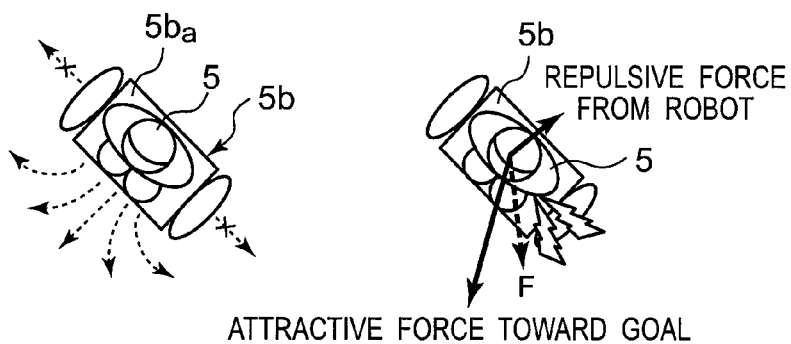
FIG. 36B is a view illustrating an example of the case where a person's behavioral principle in the conventional approach is applied to a wheelchair user.
Figure 36C:
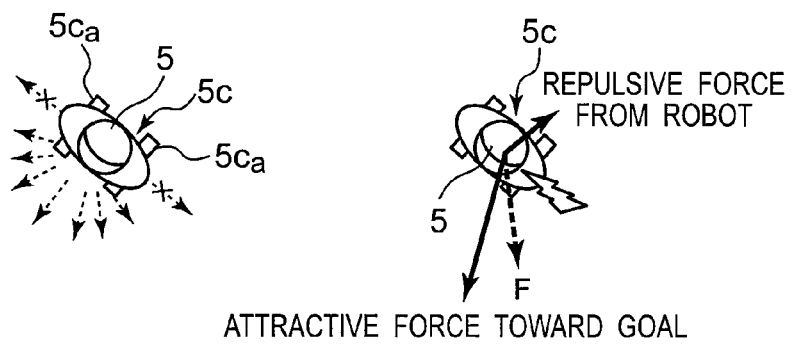
FIG. 36C is a view illustrating an example of the case where a person's behavioral principle in the conventional approach is applied to a crutch user.

FIGS. 33A and 33B illustrate methods taken by the guide path planning means 106 to determine the paths 23 for the autonomous locomotion apparatus 1 to guide the person 5, respectively. In order to determine the path 23 for the autonomous locomotion apparatus 1 to guide the person 5, the guide path planning means 106 first determines the position of a goal 24 of the path 23 to guide the person 5.

The guide path planning means 106 sets the goal 24 of the path to guide the person 5 at the position which is ahead of the current position of the autonomous locomotion apparatus 1 (the center position or the position of the gravity center of the autonomous locomotion apparatus 1) based on the information from the autonomous locomotion apparatus information acquisition means 109 by the distance $h_y$ in the longitudinal direction of FIG. 33A. The distance $h_y$ is determined by the guide path planning means 106 using the expression (9) below.

$$h_y = L \quad (9)$$

In the above expression, L represents the distance in the longitudinal direction of the path 21 for having the person 5 move along in FIG. 33A and has the value calculated in the above expression (7)

The guide path planning means 106 sets the goal 24 of the path 23 to guide the person 5 at the position which is accessible to the autonomous locomotion apparatus 1 and ahead of the goal 22 of the path for having the person 5 move along by the distance $h_x$ in the transverse direction of FIG. 33A. The distance $h_x$ is determined by the guide path planning means 106 using the expression (10) below.

$$h_x = R_p + R_r + s \quad (10)$$

In the above expression, $R_p$ and $R_r$ represent the radii of the person 5 and the autonomous locomotion apparatus 1, respectively. In the first embodiment, the radius $R_p$ of the person 5 is 30 cm in the case of the able-bodied person 5a and 40 cm in the case of the wheelchair user 5b, for example. The radius $R_r$ of the autonomous locomotion apparatus 1 is 30 cm, for example. In the above expression, s represents the distance for the person 5 and the autonomous locomotion apparatus 1 to safely pass each other, which is assumed to be, for example, 20 cm as a half of a step length of the person 5 in the first embodiment.

In order to smoothly make the travel of the autonomous locomotion apparatus 1 from the current position to the goal 24, the guide path planning means 106 approximates a path by a curve to generate the path 23 to guide the person 5. A spline curve is used for the curve approximation. The guide path planning means 106 outputs information about the generated path 23 to guide the person 5 to the mobile body locomotion control means 107.

The mobile body locomotion control means 107 performs drive control on the left and right motors 2aM and 2bM for the left wheel 2a and the right wheel 2b of the autonomous locomotion apparatus 1 so that the autonomous locomotion apparatus 1 travels on the path 23 to guide the person 5 based on the information from the autonomous locomotion apparatus information acquisition means 109 and the guide path planning means 106.

Figure 19A:
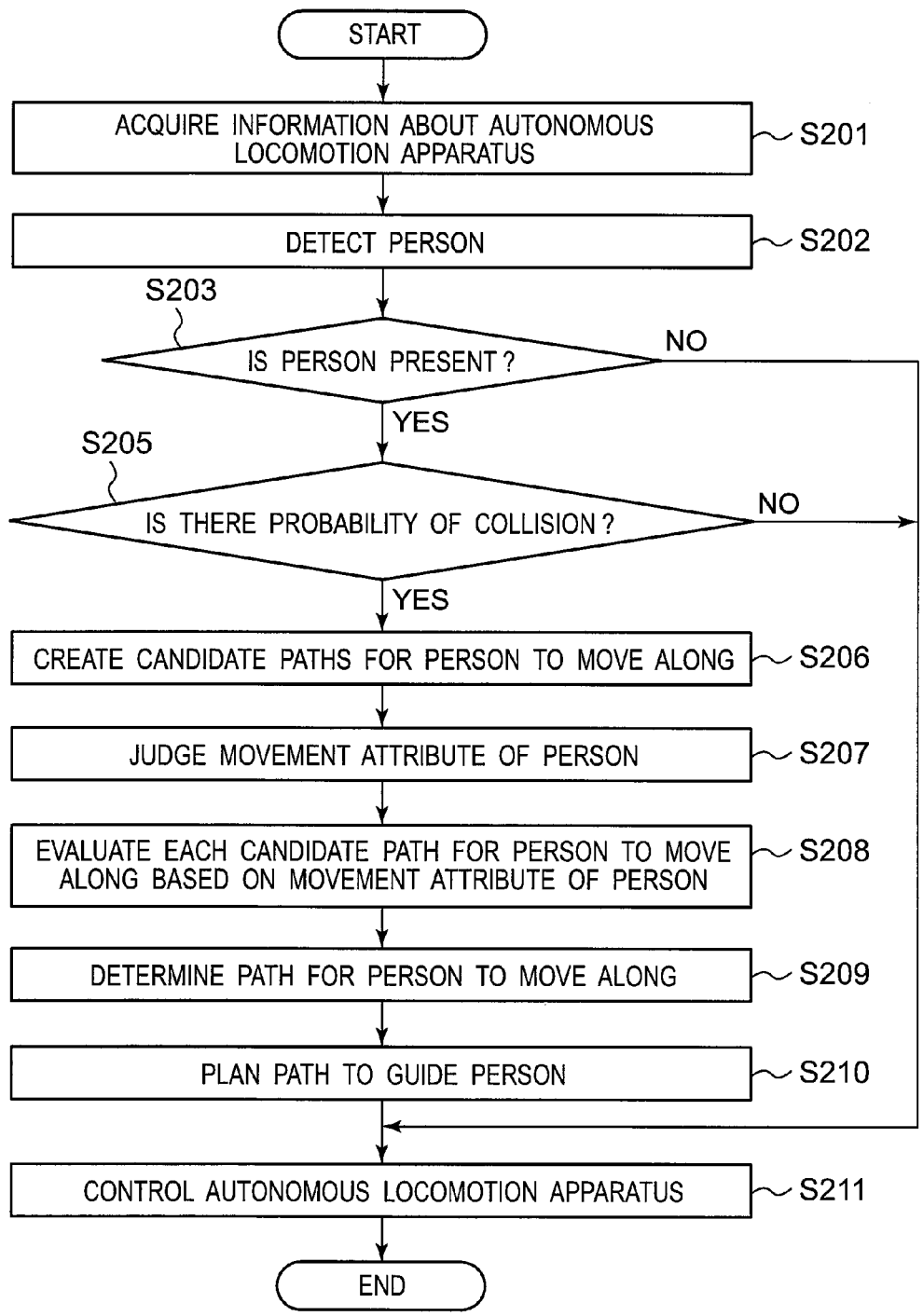
FIG. 19A is a flowchart describing an operational procedure of the autonomous locomotion apparatus according to the first embodiment of the present invention.

FIG. 19A shows a process flow of operation of the autonomous locomotion apparatus 1 according to the first embodiment.

First, information about the position and the speed of the autonomous locomotion apparatus 1 in the environment in which the autonomous locomotion apparatus 1 travels is acquired by the autonomous locomotion apparatus information acquisition means 109 based on the information from the LRF sensor 3 and the human detection means 101 and information from the encoders 2aE and 2bE for the left and right motors 2aM and 2bM for the left wheel 2a and the right wheel 2b (step S201).

Next, the person 5 in the surroundings of the autonomous locomotion apparatus 1 is detected by the LRF sensor 3 and the human detection means 101 (step S202)

Next, the presence of the person 5 is judged by the human detection means 101 (step S203). When it is judged by the human detection means 101 that the person 5 is not present, the process proceeds to step S211, in which the autonomous locomotion apparatus 1 is controlled by the mobile body locomotion control means 107 so that the autonomous locomotion apparatus 1 travels on the path to guide the person 5 which is planned last time by the guide path planning means 106. In the case where the path to guide the person 5 has not been planned by the guide path planning means 106, the autonomous locomotion apparatus 1 is controlled by the mobile body locomotion control means 107 so that the autonomous locomotion apparatus 1 travels along the path which has been determined when the autonomous locomotion apparatus 1 started traveling.

When it is judged by the human detection means 101 that the person 5 is present, probability of collision between the person 5 detected by the human detection means 101 and the autonomous locomotion apparatus 1 is judged by the collision judgment means 102 based on the information from the human detection means 101 and the autonomous locomotion apparatus information acquisition means 109 (step S205). When it is judged by the collision judgment means 102 that there is no probability of collision with the person 5, the process proceeds to step S211, in which the autonomous locomotion apparatus 1 is controlled by the mobile body locomotion control means 107 so that the autonomous locomotion apparatus 1 travels on the path to guide the person 5 which is planned last time by the guide path planning means 106. In the case where the path to guide the person 5 has not been planned by the guide path planning means 106, the autonomous locomotion apparatus 1 is controlled by the mobile body locomotion control means 107 so that the autonomous locomotion apparatus 1 travels along the path which has been determined when the autonomous locomotion apparatus 1 started traveling.

When it is judged by the collision judgment means 102 that there is the probability of collision with the person 5, candidate paths for having the person 5 move along are created by the human path candidate creation means 103 (step S206).

Next, the movement attribute (attribute about the mobility capability) of the person 5 who is detected by the tag reader 4 is judged by the human movement attribute acquisition means 108 (step S207).

Next, based on the movement attribute of the person 5 judged by the human movement attribute acquisition means 108, the movement load which represents the easiness of movement of the person 5 is evaluated by the human path load evaluation means 104 for each candidate path created by the human path candidate creation means 103 (step S208).

Next, based on the movement load for each candidate path evaluated by the human path load evaluation means 104, a path which imposes the minimum movement load on the person 5 is selected by the human path determination means 105 as the easiest path for the person 5 to avoid the autonomous locomotion apparatus 1, and the path for having the person 5 move along is determined by the human path determination means 105 (step S209).

Next, a path for the autonomous locomotion apparatus 1 is planned by the guide path planning means 106 so that the autonomous locomotion apparatus 1 guides the person 5 to the path for having the person 5 move along which is determined by the human path determination means 105 (step S210)

Next, the autonomous locomotion apparatus 1 is controlled by the mobile body locomotion control means 107 so that the autonomous locomotion apparatus 1 travels on the path which is planned by the guide path planning means 106 as the path to guide the person 5 (step S211).

The autonomous locomotion apparatus 1 operates in the above described manner.

Figure 18B:
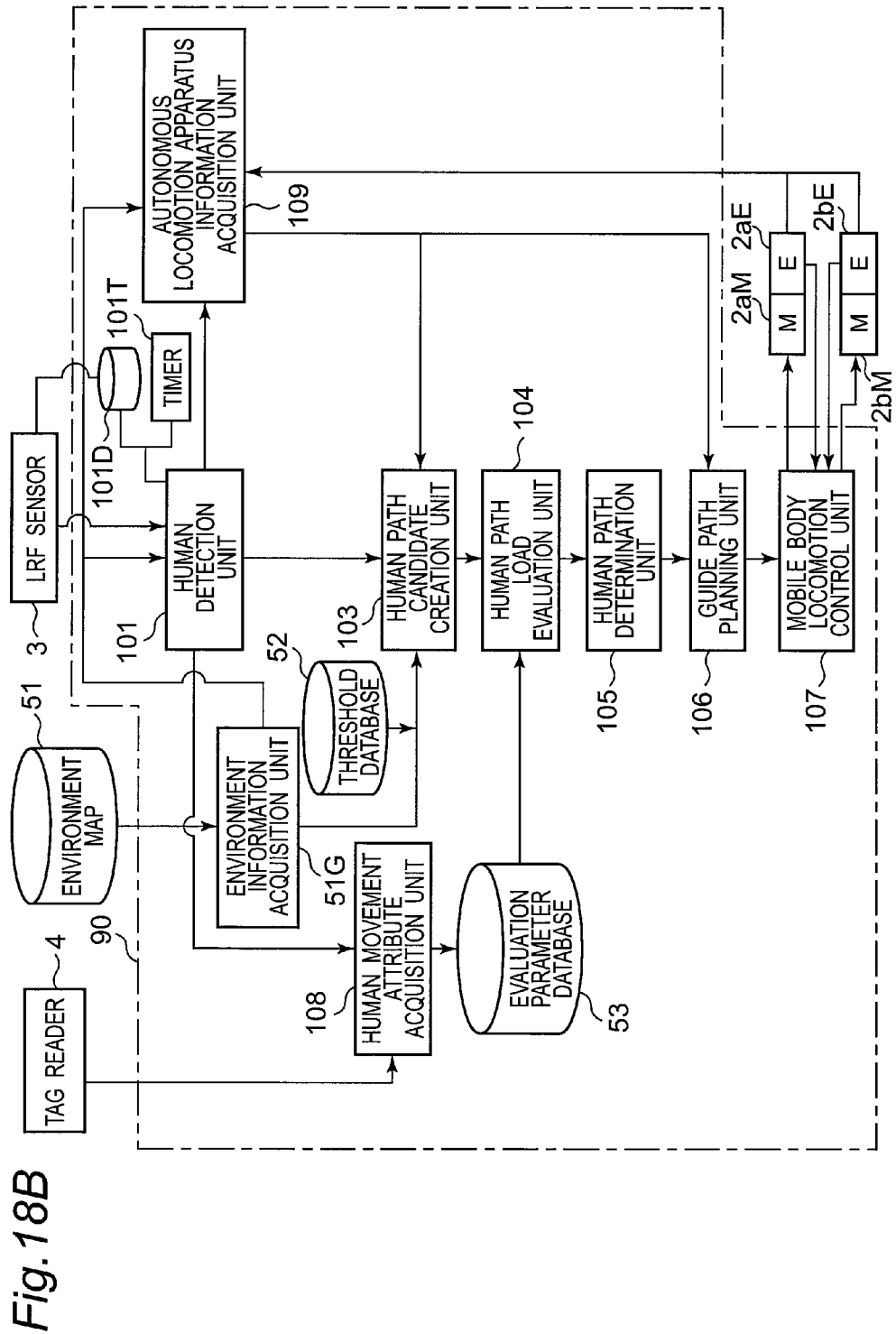
FIG. 18B is a block diagram illustrating a configuration of the autonomous locomotion apparatus according to a modification of the first embodiment of the present invention.

The present invention is not limited to the above described embodiment and can be implemented by the other various aspects. For example, the collision judgment means 102 illustrated in FIG. 18A may be omitted as illustrated in FIG. 18B. In the above described embodiment, the collision judgment means 102 judges the probability of collision on the assumption that the person 5 and the autonomous locomotion apparatus 1 move in a straight line with constant speed. However, the probability of collision apt to be influenced by change in speed of the person 5. Therefore, when the autonomous locomotion apparatus 1 is configured without the collision judgment means 102, it can more surely guide the person 5 to the easy path for the person 5 to avoid the autonomous locomotion apparatus 1 since the autonomous locomotion apparatus 1 promptly responds to the detection of the person 5 without being influenced by the variance of the probability of collision.

Figure 19B:
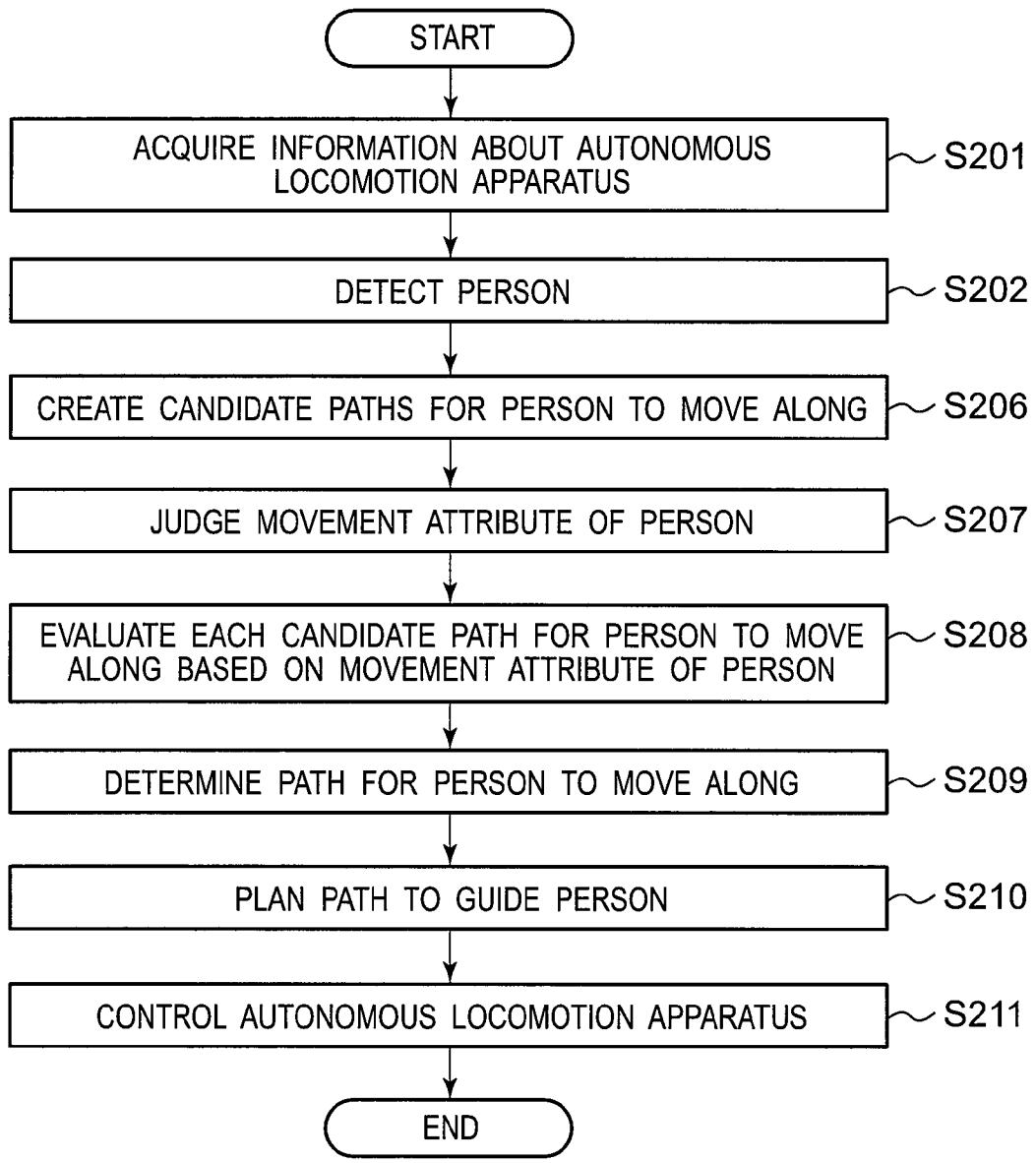
FIG. 19B is a flowchart describing an operational procedure of the autonomous locomotion apparatus according to a modification of the first embodiment of the present invention.

Steps S203 to S205 in the operation of the autonomous locomotion apparatus 1 of FIG. 19A may be omitted as illustrated in FIG. 19B. Steps S203 to S205 in the above described embodiment, the probability of collision is judged on the assumption that the person 5 and the autonomous locomotion apparatus 1 move in a straight line with constant speed. However, the probability of collision apt to be influenced by change in speed of the person 5. Therefore, when the autonomous locomotion apparatus 1 is configured to operate without steps S203 to S205, it can more surely guide the person 5 to the easy path for the person 5 to avoid the autonomous locomotion apparatus 1 since the autonomous locomotion apparatus 1 promptly responds to the detection of the person 5 without being influenced by the variance of the probability of collision.

Incidentally, in the above described embodiment, each component or a part of the control unit 90 may be configured as software. Therefore, the control unit 90 may be configured as a computer program consisting of steps for implementing the respective control operations of the embodiment of the present specification so that the steps may be stored in a computer readable recording medium such as a storage device (hard disk or the like) to be read in a temporary memory (semiconductor memory or the like) of a computer and to be executed by the CPU and may be implemented as the computer program.

Although the present invention has been described about the first embodiment and the modifications, it is needless to say that the present invention is not limited to the first embodiment and the modifications. The cases below are also included in the present invention.

Part or entirety of the autonomous locomotion apparatus except for the human detection unit is actually a computer system that includes, for example, a microprocessor, ROM, RAM, hard disk unit, display unit, keyboard, mouse, and the like. A computer program is stored on the RAM or the hard disk unit. Functions of each of the apparatuses can be achieved by the microprocessor operating according to the computer program. The computer program mentioned here is a combination of a plurality of instruction codes that indicate commands to a computer for achieving predetermined functions.

For example, each component can be implemented as a result that a program executing means (part/unit) such as a CPU reads and executes software programs recorded in a recording medium such as a hard disk or semiconductor memory. Here, software that implements a part or entirety of the apparatus according to each of the above-mentioned embodiments is a following program. That is, such a program is a program for controlling an autonomous locomotion apparatus which autonomously determines a moving path and moves accordingly, wherein the program causes a computer to function as:
an autonomous locomotion apparatus information acquisition means that acquires a position and a speed of the autonomous locomotion apparatus;
a human movement attribute acquisition unit that acquires an attribute of person's movement based on mobility capability of the person which represents easiness of movement of the person for each of travel directions of the person detected by a human detection unit that detects a person around the autonomous locomotion apparatus to acquire a position, a speed, and a direction of travel of the person;

a human path candidate creation unit that creates a plurality of candidate paths for having the person move along;

a human path load evaluation unit that evaluates a movement load for each of candidate paths created by the human path candidate creation unit based on the attributes based on the mobility capability of the person acquired by the human movement attribute acquisition unit, wherein the movement load represents a time taken for movement according to the person's easiness of movement for each of travel directions of travel of the person;

a human path determination unit that determines a path for having the person move along from among the candidate paths created by the human path candidate creation unit based on the movement load calculated by the human path load evaluation unit;

a guide path planning unit that plans a path for the autonomous locomotion apparatus to guide the person to the path determined by the human path determination unit; and a locomotion control unit that controls the autonomous locomotion apparatus to travel along the guide path planned by the guide path planning unit.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment (s) or modification (s) of the aforementioned various embodiments and modifications, the effects possessed by the embodiment (s) or modification (s) can be produced.

The autonomous locomotion apparatus, the autonomous locomotion method, and the program for the autonomous locomotion apparatus according to the present invention have a function of guiding a person to a path easy for the person to avoid the autonomous locomotion apparatus based on the movement attribute of the person and are usefully applied to a load-carrying robot and a cleaning robot in a hospital. Other than for hospital use, they can also be applied to a guide robot, a guard robot, and a car-like mobile robot.

The entire disclosure of Japanese Patent Application No. 2011-245693 filed on Nov. 9, 2011, including specification, claims, drawings, and summary are incorporated herein by reference in its entirety.

Although the present disclosure has been fully described in connection with the embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An autonomous locomotion apparatus which autonomously determines a moving path and moves accordingly, comprising:

an autonomous locomotion apparatus information acquisition unit that acquires a position and a speed of the autonomous locomotion apparatus;

a human detection unit that detects a person around the autonomous locomotion apparatus to acquire a position, a speed, and a direction of travel of the person;

a human movement attribute acquisition unit that acquires an attribute of person's movement based on mobility capability of the person which represents easiness of movement of the person for each of travel directions of the person detected by the human detection unit;

a human path candidate creation unit that creates a plurality of candidate paths for having the person move along based on the position and the speed of the autonomous locomotion apparatus acquired by the autonomous locomotion apparatus information acquisition unit and the position, the speed, and the direction of travel of the person acquired by the human detection unit;

a human path load evaluation unit that evaluates a movement load for each candidate path created by the human path candidate creation unit by using an evaluation formula based on information from the human path candidate creation unit and information from the human movement attribute acquisition unit, wherein the movement load represents a time taken for movement according to the person's easiness of movement for each direction of travel of the person, and the evaluation formula includes a load of a person's travel distance and a load of a person's direction change among the attributes based on the mobility capability of the person acquired by the human movement attribute acquisition unit;

a human path determination unit that determines a path for having the person move along from among the candidate paths created by the human path candidate creation unit based on the movement load calculated by the human path load evaluation unit;

a guide path planning unit that plans a path for the autonomous locomotion apparatus to guide the person to the path determined by the human path determination unit based on information from the autonomous locomotion apparatus information acquisition unit and information from the human path determination unit; and a locomotion control unit that controls the autonomous locomotion apparatus to travel along the guide path planned by the guide path planning unit based on the information from the autonomous locomotion apparatus information acquisition unit and information from the guide path planning unit.

2. The autonomous locomotion apparatus according to claim 1, wherein the human movement attribute acquisition unit acquires information about the person's direction change as a human movement attribute.

3. The autonomous locomotion apparatus according to claim 1, further comprising a collision judgment unit that judges presence or absence of probability of collision between the person detected by the human detection unit and the autonomous locomotion apparatus based on the information from the autonomous locomotion apparatus information acquisition unit and information from the human detection unit, wherein when the collision judgment unit judges that there is the probability of collision between the person and the autonomous locomotion apparatus, the human path candidate creation unit creates a candidate path for having the person move along based on information from the collision judgment unit.

4. The autonomous locomotion apparatus according to claim 3, wherein the human path candidate creation unit determines a goal of the candidate path based on a predicted time left for the autonomous locomotion apparatus and the person to collide with each other and the speed of the person.

5. The autonomous locomotion apparatus according to claim 1, wherein the human path determination unit determines a path for having the person move along based on an environment map for the autonomous locomotion apparatus to travel and the movement load calculated by the human path load evaluation unit.

6. The autonomous locomotion apparatus according to claim 1, wherein the human path determination unit selects a candidate path which imposes a minimum movement load on the person and is easy for the person to avoid the autonomous locomotion apparatus.

7. An autonomous locomotion method for an autonomous locomotion apparatus which autonomously determines a moving path and moves accordingly, comprising:
  acquiring information of a position and information of a speed of an autonomous locomotion apparatus;
  acquiring a position, a speed, and travel directions of a person around the autonomous locomotion apparatus;
  acquiring attribute information based on mobility capability of the person which represents easiness of movement of the person for each of the travel directions of the detected person;
  creating a plurality of candidate paths for having the person move along based on the position and the speed of the autonomous locomotion apparatus and the position, the speed, and the travel direction of the person;
  evaluating a movement load for each of the candidate paths by using an evaluation formula based on information of the candidate paths and the attribute information, wherein the movement load represents a time taken for movement according to person's easiness of movement for each the travel directions of the person, and the evaluation formula includes a load of a person's travel distance and a load of a person's direction change among pieces of attribute information based on the mobility capability of the person;
  determining a path for having the person move along from among the candidate paths based on the movement load;
  planning a path for the autonomous locomotion apparatus to guide the person to the determined path based on the information of the position and the speed of the autonomous locomotion apparatus and information of the path for having the person move along; and
  controlling the autonomous locomotion apparatus to travel along the planned guide path based on the information of the position and the speed of the autonomous locomotion apparatus and information of the path of the autonomous locomotion apparatus for guiding the person.

8. A computer-readable recording medium including a program for controlling an autonomous locomotion apparatus which autonomously determines a moving path and moves accordingly, wherein the program causes a computer to function as:

an autonomous locomotion apparatus information acquisition means that acquires a position and a speed of the autonomous locomotion apparatus;

a human movement attribute acquisition unit that acquires an attribute of person's movement based on mobility capability of the person which represents easiness of movement of the person for each of travel directions of the person detected by a human detection unit that detects a person around the autonomous locomotion apparatus to acquire a position, a speed, and a direction of travel of the person;

a human path candidate creation unit that creates a plurality of candidate paths for having the person move along based on the position and the speed of the autonomous locomotion apparatus acquired by the autonomous locomotion apparatus information acquisition unit and the position, the speed, and the direction of travel of the person acquired by the human detection unit;

a human path load evaluation unit that evaluates a movement load for each of candidate paths created by the human path candidate creation unit by using an evaluation formula based on information from the human path candidate creation unit and information from the human movement attribute acquisition unit, wherein the movement load represents a time taken for movement according to the person's easiness of movement for each of travel directions of travel, and the evaluation formula includes a load of a person's travel distance and a load of a person's direction change among the attributes based on the mobility capability of the person acquired by the human movement attribute acquisition unit;

a human path determination unit that determines a path for having the person move along from among the candidate paths created by the human path candidate creation unit based on the movement load calculated by the human path load evaluation unit;

a guide path planning unit that plans a path for the autonomous locomotion apparatus to guide the person to the path determined by the human path determination unit based on information from the autonomous locomotion apparatus information acquisition unit and information from the human path determination unit; and a locomotion control unit that controls the autonomous locomotion apparatus to travel along the guide path planned by the guide path planning unit based on the information from the autonomous locomotion apparatus information acquisition unit and information from the guide path planning unit.

\* \* \* \* \*